(12) United States Patent
Ito

(10) Patent No.: US 9,594,800 B2
(45) Date of Patent: Mar. 14, 2017

(54) IMAGE INFORMATION PROCESSING APPARATUS, IMAGE INFORMATION PROCESSING METHOD, AND NON-TRANSITORY COMPUTER READABLE MEDIUM

(71) Applicant: FUJI XEROX CO., LTD, Minato-ku, Tokyo (JP)

(72) Inventor: Yasuhiro Ito, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 243 days.

(21) Appl. No.: 14/263,377

(22) Filed: Apr. 28, 2014

(65) Prior Publication Data

US 2015/0127674 A1 May 7, 2015

(30) Foreign Application Priority Data

Nov. 1, 2013 (JP) ................................ 2013-228495

(51) Int. Cl.
*G06F 17/30* (2006.01)
*G06F 3/0485* (2013.01)
*G06F 3/0482* (2013.01)
*G06F 3/0488* (2013.01)

(52) U.S. Cl.
CPC ...... *G06F 17/30386* (2013.01); *G06F 3/0482* (2013.01); *G06F 3/0485* (2013.01); *G06F 3/0488* (2013.01); *G06F 2203/04808* (2013.01)

(58) Field of Classification Search
CPC ... G06F 17/30864; G06Q 10/10; G06Q 30/02
USPC ........ 707/758, 770, 803, 748; 715/765, 230; 382/232, 305, 187
See application file for complete search history.

(56) References Cited

U.S. PATENT DOCUMENTS

| | | | |
|---|---|---|---|
| 2004/0022444 A1* | 2/2004 | Rhoads | G06K 9/00577 382/232 |
| 2005/0034084 A1* | 2/2005 | Ohtsuki | G06T 15/04 715/864 |
| 2005/0223315 A1* | 10/2005 | Shimizu | G06F 17/241 715/230 |
| 2007/0172155 A1* | 7/2007 | Guckenberger | G06F 17/30247 382/305 |
| 2008/0235275 A1* | 9/2008 | Tanaka | H04N 1/2158 |
| 2008/0263036 A1* | 10/2008 | Yamamoto | G06F 17/30011 |

(Continued)

FOREIGN PATENT DOCUMENTS

JP 2000-137555 A 5/2000
JP 2012-48602 A 3/2012

*Primary Examiner* — Jeffrey A Burke
*Assistant Examiner* — Thong Vu
(74) *Attorney, Agent, or Firm* — Sughrue Mion, PLLC

(57) ABSTRACT

An image information processing apparatus includes a memory, a list screen display, a detector, and a screen controller. The memory stores plural pieces of image information and plural pieces of related information related to the plural pieces of image information. The list screen display displays a list screen showing a list of the plural pieces of image information. The detector detects an indication operation having a direction, with a certain position on the screen being an origin. The screen controller performs, in accordance with a position and direction of the indication operation, control to switch between scrolling of the screen and display of a list of the plural pieces of related information.

17 Claims, 33 Drawing Sheets

(56) References Cited

U.S. PATENT DOCUMENTS

| | | | |
|---|---|---|---|
| 2012/0093421 A1* | 4/2012 | Kletter | G06K 9/00483 |
| | | | 382/209 |
| 2012/0268465 A1* | 10/2012 | Inada | G06T 11/00 |
| | | | 345/428 |
| 2013/0128060 A1* | 5/2013 | Rhoads | G01C 21/20 |
| | | | 348/207.1 |
| 2013/0132848 A1* | 5/2013 | Bhatt | G06F 9/542 |
| | | | 715/733 |
| 2013/0174077 A1 | 7/2013 | Asami et al. | |
| 2013/0326380 A1* | 12/2013 | Lai | G06F 3/0481 |
| | | | 715/765 |
| 2014/0188894 A1* | 7/2014 | Chechik | G06F 3/04883 |
| | | | 707/748 |
| 2015/0009334 A1* | 1/2015 | Kwon | H04N 5/23293 |
| | | | 348/164 |
| 2015/0026176 A1* | 1/2015 | Bullock | G06F 17/3064 |
| | | | 707/736 |
| 2015/0123993 A1* | 5/2015 | Ohba | G09G 5/00 |
| | | | 345/629 |
| 2015/0220490 A1* | 8/2015 | Barber | G06F 17/212 |
| | | | 715/234 |
| 2016/0103830 A1* | 4/2016 | Cheong | G06F 3/0488 |
| | | | 715/738 |

* cited by examiner

IMAGE INFORMATION PROCESSING APPARATUS, IMAGE INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-228495 filed Nov. 1, 2013.

BACKGROUND (i) Technical Field

The present invention relates to an image information processing apparatus, an image information processing method, and a non-transitory computer readable medium.

(ii) Related Art

In information equipment such as a personal computer, a tablet terminal, or a smart phone, a list of pieces of image data of documents or the like may be displayed on a screen.

SUMMARY

According to an aspect of the invention, there is provided an image information processing apparatus including a memory, a list screen display, a detector, and a screen controller. The memory stores plural pieces of image information and plural pieces of related information related to the plural pieces of image information. The list screen display displays a list screen showing a list of the plural pieces of image information. The detector detects an indication operation having a direction, with a certain position on the screen being an origin. The screen controller performs, in accordance with a position and direction of the indication operation, control to switch between scrolling of the screen and display of a list of the plural pieces of related information.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the drawings. Here, a document is used as image information (image data). Note that the exemplary embodiment of the present invention is not limited to a document, and is of course applicable to other types of image information, for example, photograph data, moving image data, and the like. Further, music data is also applicable if the file of the music data is displayed as an image, such as an icon.

Figure 1:
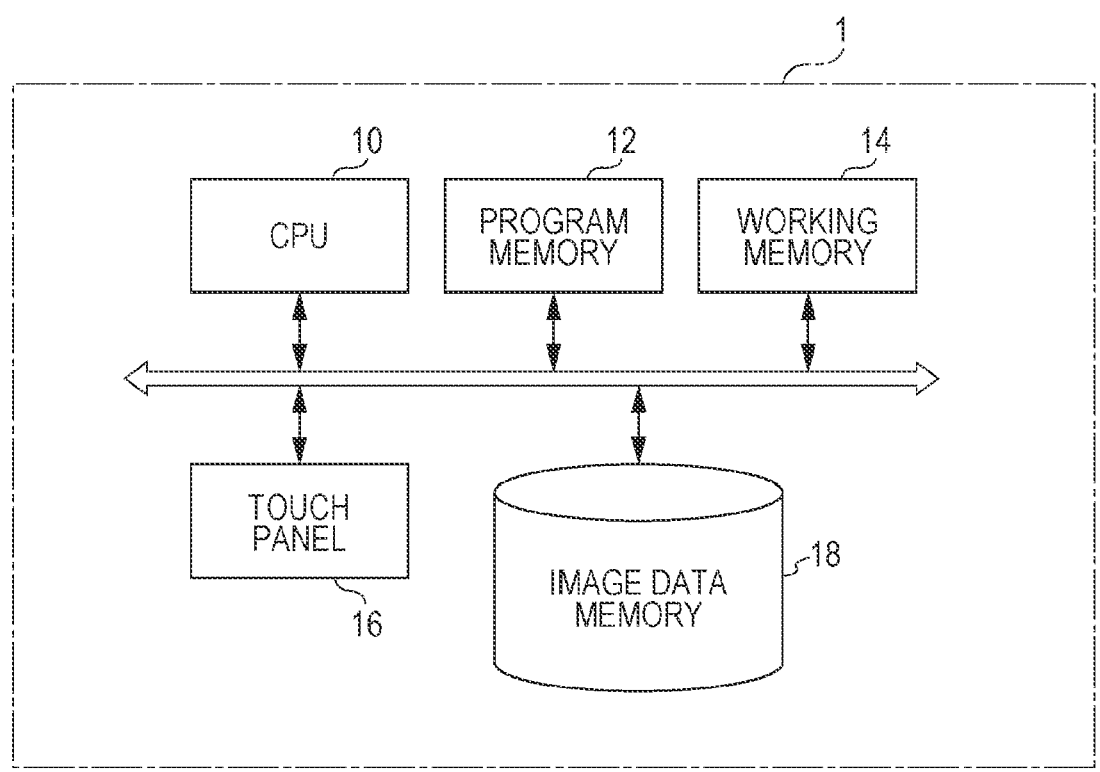
FIG. 1 is a diagram illustrating the configuration of an image information processing apparatus according to the exemplary embodiment.

FIG. 1 is a block diagram illustrating the configuration of an image information processing apparatus 1 according to the exemplary embodiment. The image information processing apparatus 1 includes a central processing unit (CPU) 10, a program memory 12, a working memory 14, a touch panel 16, and an image data memory 18.

The CPU 10 reads out processing programs stored in the program memory 12, sequentially executes the programs, and thereby executes various functions. Specifically, the CPU 10 detects a user operation performed on the touch panel 16, accesses the image data memory 18 in response to the operation, and executes a function of displaying a list of documents on the touch panel 16; a function of detecting a specific user operation on the touch panel 16, specifically a function of detecting a flick operation, which is an indication operation having a direction, with a certain position being the origin; a function of switching between (i) a scroll function of scrolling, in accordance with a position and direction of a flick operation, a screen on which a list of documents is displayed, and (ii) a list display function of displaying a list of pieces of related information (metadata), such as file information or attribute information on documents; or a function of executing search in response to a flick operation. The term "flick" generally means "to quickly move something away", but in this case means "sliding of a finger (flip)". In the exemplary embodiment, sliding of a finger is collectively referred to as a "flick operation". The "flick operation" may include any operation as long as the operation has a direction with a certain position being the origin.

The program memory 12 is constituted by a read only memory (ROM) or the like and stores a processing program. The processing program may be stored in the program memory 12 in advance, or may be downloaded from a server via a network. The processing program may be stored in the program memory 12 in advance, and the version upgrade programs thereof may be sequentially downloaded from a server.

The working memory 14 is constituted by a random access memory (RAM) or the like, and temporarily stores various pieces of data when the CPU 10 executes various functions.

The touch panel 16 is made up of a combination of a display device such as a liquid crystal panel and a position input device such as a touch pad, and is operated by a user using a finger, an input pen, or the like. There are various operating principles of the touch panel 16. In the exemplary embodiment, the touch panel 16 may be of any of a matrix switch type, a resistance film type, an electromagnetic induction type, an infrared type, and a capacitance type.

The image data memory 18 is constituted by a hard disk, a semiconductor memory, or the like, and stores plural pieces of document data, which is image data. Document data includes text data and image data that form a body of a document, and also includes file information and attribute information. A document may be created by a user using the image information processing apparatus 1 and may be stored in the image data memory 18. Alternatively, a document may be downloaded from a server or another image processing apparatus via a network. Alternatively, the image data memory 18 may exist in a server on a network.

The image information processing apparatus 1 may function as information equipment, such as a personal computer, a tablet terminal, or a smart phone. The image information processing apparatus 1 may function as a stand-alone apparatus, or may function as a client apparatus in a server-client system in which a server and a client are connected to each other via a network.

In the exemplary embodiment, the CPU 10 detects a flick operation on the touch panel 16 performed by a user, and displays, in accordance with a position and direction of the flick operation, various screens from a state where a list of documents is displayed, so that a desired image may be searched for by performing a simple operation. Hereinafter, processes according to the exemplary embodiment will be described in detail.

Figure 2:
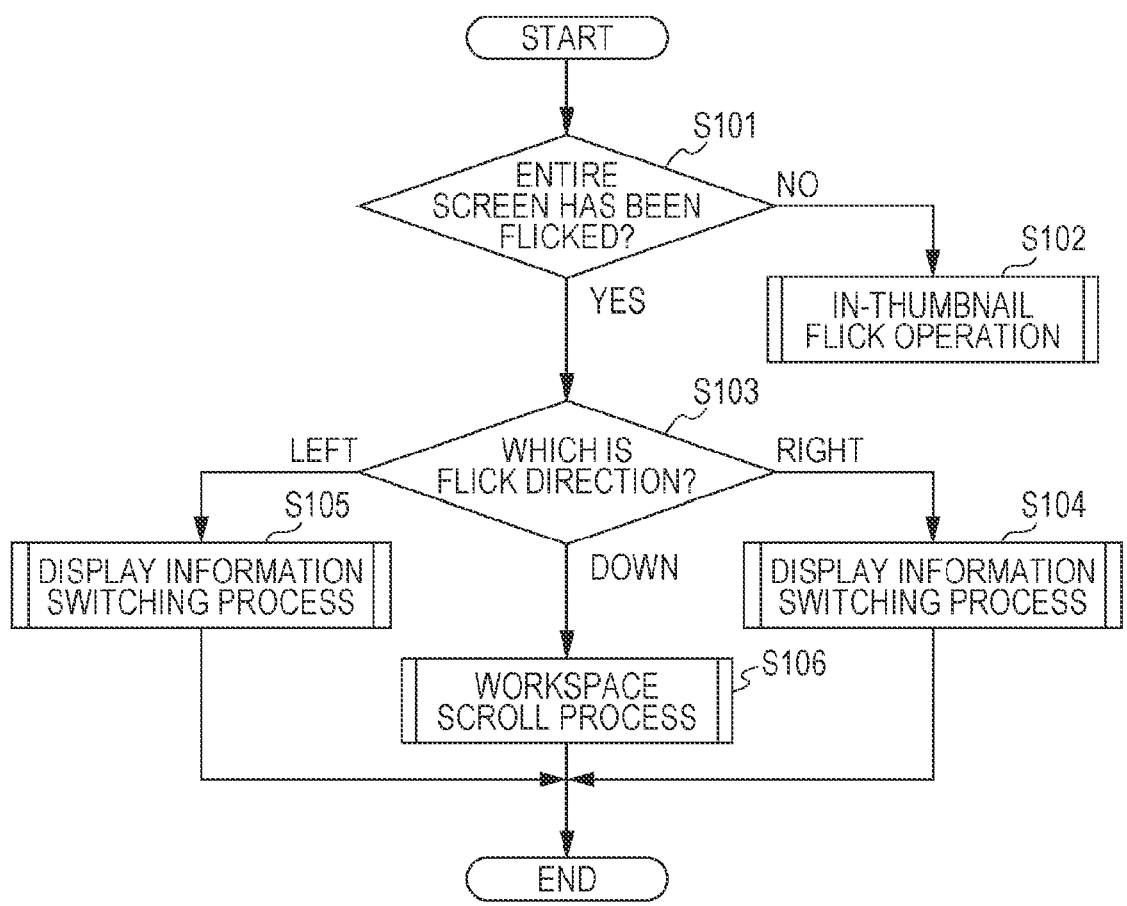
FIG. 2 is a flowchart illustrating an overall process according to the exemplary embodiment.

FIG. 2 is a flowchart illustrating an overall process according to the exemplary embodiment. This process is performed in a state where a list of thumbnails of documents is displayed on the screen of the touch panel 16.

First, the CPU 10 determines whether or not a user has performed a flick operation on the entire screen (S101). Here, the "flick operation", which is commonly performed, is an operation performed by a user of moving his/her finger with the finger touching the screen. A list of thumbnails of documents is displayed on the screen. If a flick operation is performed at a position other than the positions of the thumbnails of the documents, the CPU 10 detects it as a flick operation for the entire screen.

If the flick operation is not for the entire screen, that is, if the flick operation is a flick operation on a thumbnail, the CPU 10 executes a certain in-thumbnail flick operation subroutine (S102).

If the flick operation is for the entire screen, the CPU 10 determines the direction of the flick operation (S103). If the direction of the flick operation is the right direction of the screen, that is, if the user has moved his/her finger in the right direction of the screen with the finger touching the screen, the CPU 10 executes a certain display information switching process subroutine (S104). If the direction of the flick operation is the left direction of the screen, that is, if the user has moved his/her finger in the left direction of the screen with the finger touching the screen, the CPU 10 executes a certain display information switching process subroutine (S105). Further, if the direction of the flick operation is the downward direction of the screen, that is, if the user has moved his/her finer in the downward direction of the screen with the finger touching the screen, the CPU 10 executes a certain workspace scroll process subroutine (S106).

The in-thumbnail flick operation subroutine (S102), the display information switching process subroutines (S104 and S105), and the workspace scroll process subroutine (S106) will be described below.

Figure 3:
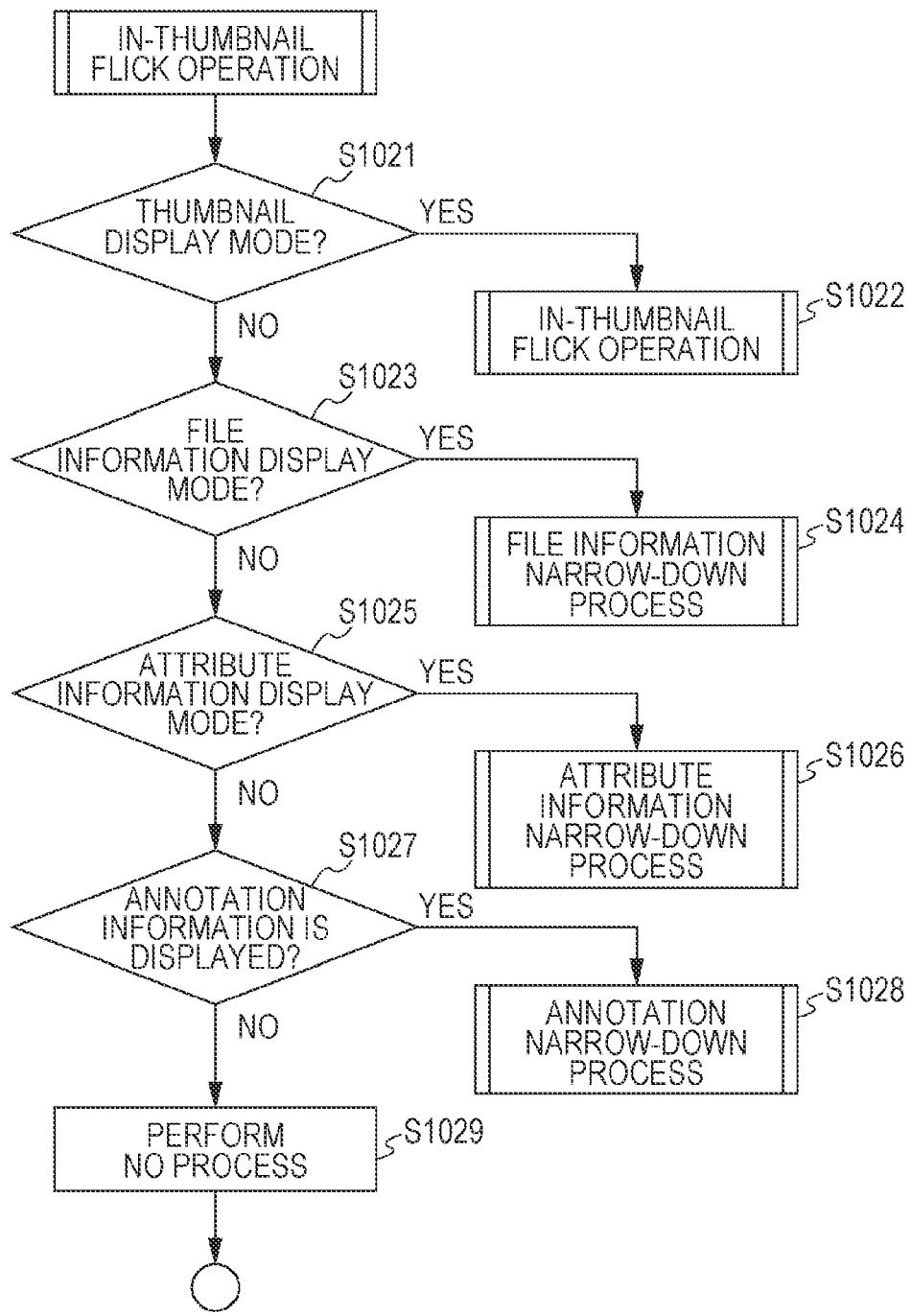
FIG. 3 is a first detailed flowchart illustrating a process according to the exemplary embodiment.

FIG. 3 is a flowchart illustrating the details of the in-thumbnail flick operation subroutine.

First, the CPU 10 determines whether or not the current mode of the screen of the touch panel 16 is a thumbnail display mode (S1021).

If the current mode is the thumbnail display mode, that is, a mode in which a list of thumbnails of documents is displayed, the CPU 10 executes a certain in-thumbnail flick operation (S1022).

If the current mode is not the thumbnail display mode, the CPU 10 determines whether or nor the current mode is a file information display mode (S1023). The file information display mode is a mode in which pieces of file information on documents are displayed, and is a mode that is set by a flick operation from the thumbnail display mode. The file information is information representing a file name, date/time of update, creation date, author, and so forth of a document.

If the current mode is the file information display mode, the CPU 10 executes a certain file information narrow-down process (S1024).

If the current mode is not the file information display mode, the CPU 10 determines whether or not the current mode is an attribute information display mode (S1025). The attribute information display mode is a mode in which pieces of attribute information on documents are displayed, and is a mode that is set by a flick operation from the thumbnail display mode. The attribute information is information representing user attributes of a document (the name of a group to which the user belongs, the position of the user, whether or not the document has been viewed or transmitted by fax, and so forth).

If the current mode is the attribute information display mode, the CPU 10 executes a certain attribute information narrow-down process (S1026).

If the current mode is not the attribute information display mode, the CPU 10 determines whether or not annotation information is displayed (S1027). An annotation means a display object that includes position information, attribute information, text information, or the like given to a document and that is given separately from a body of a document.

If annotation information is displayed, the CPU 10 executes a certain annotation narrow-down process (S1028).

If annotation information is not displayed, the CPU 10 does not execute any process, and maintains the screen (S1029).

Figure 4:
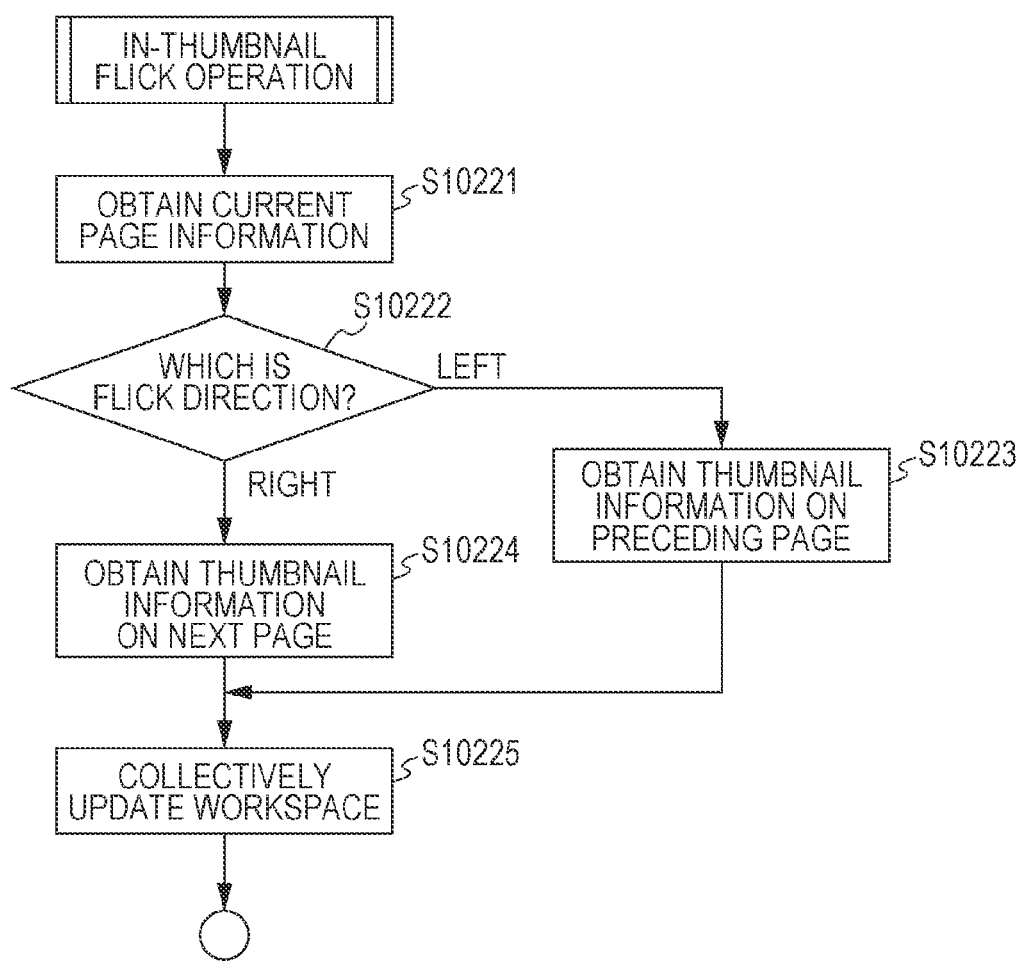
FIG. 4 is a second detailed flowchart illustrating a process according to the exemplary embodiment.

FIG. 4 is a flowchart illustrating the details of the in-thumbnail flick operation (S1022).

First, the CPU 10 obtains page information that is currently displayed (S10221). Specifically, the CPU 10 obtains page information that is currently displayed in the thumbnail display mode.

Subsequently, the CPU 10 determines a flick direction (S10222). If the flick direction is the left direction, the CPU 10 obtains the thumbnail information on the preceding page (S10223). If the flick direction is the right direction, the CPU 10 obtains the thumbnail information on the next page (S10224).

After obtaining the thumbnail information on the preceding page or next page in accordance with the flick direction, the CPU 10 collectively updates the workspace (S10225). That is, the CPU 10 displays the thumbnail information that has been obtained in accordance with the flick direction on the screen. In a case where thumbnails are displayed on the screen, if the user performs a flick operation in the right direction within one of the thumbnails, thumbnails of the next pages of the documents represented by the thumbnails are displayed on the screen. If the user performs a flick operation in the left direction within one of the thumbnails, thumbnails of the preceding pages of the documents represented by the thumbnails are displayed on the screen. In a case where only a thumbnail of one document is displayed on the screen, if the user performs a flick operation in the right direction, a thumbnail of the next page of the document is displayed. In a case where thumbnails of plural documents are displayed on the screen, if the user performs a flick operation in the right direction, thumbnails of the next pages of all the displayed documents are displayed.

A technique of changing a page by a flick operation is commonly used in electronic books. Note that, in the exemplary embodiment, all of plural thumbnails on a page are simultaneously changed in conjunction with one another.

Figure 5:
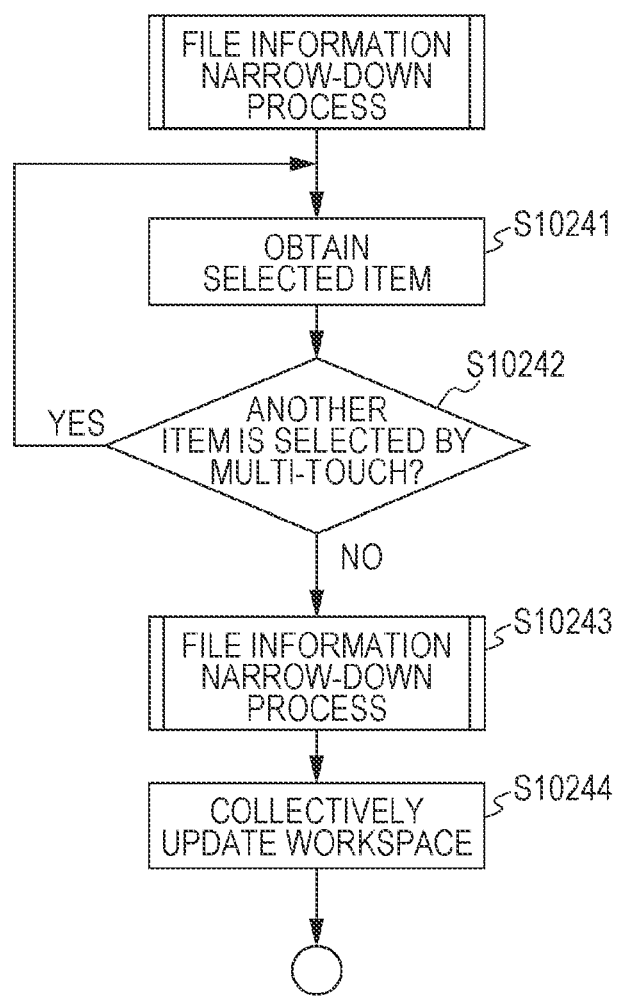
FIG. 5 is a third detailed flowchart illustrating a process according to the exemplary embodiment.

FIG. 5 is a flowchart illustrating the details of the file information narrow-down process (S1024).

First, the CPU 10 obtains a selected item (S10241). Specifically, if a flick operation is performed in the file information display mode, the CPU 10 obtains, as a selected item, a flicked item included in the file information.

Subsequently, the CPU 10 determines whether or not another item is selected by multi-touch (S10242). If a multi-touch flick operation is performed, the CPU 10 obtains a selected item again. For example, if a flick operation is performed using a forefinger and a middle finger, the CPU 10 selects the item flicked by the forefinger and also selects the item flicked by the middle finger.

After obtaining the selected item or items, the CPU 10 performs a file information narrow-down process (S10243) and collectively updates the workspace (S10244). That is, the CPU 10 extracts, from among pieces of file information, only one or more pieces of file information including an item that matches the selected item or items, and displays the extracted pieces of file information on the screen.

Figure 6:
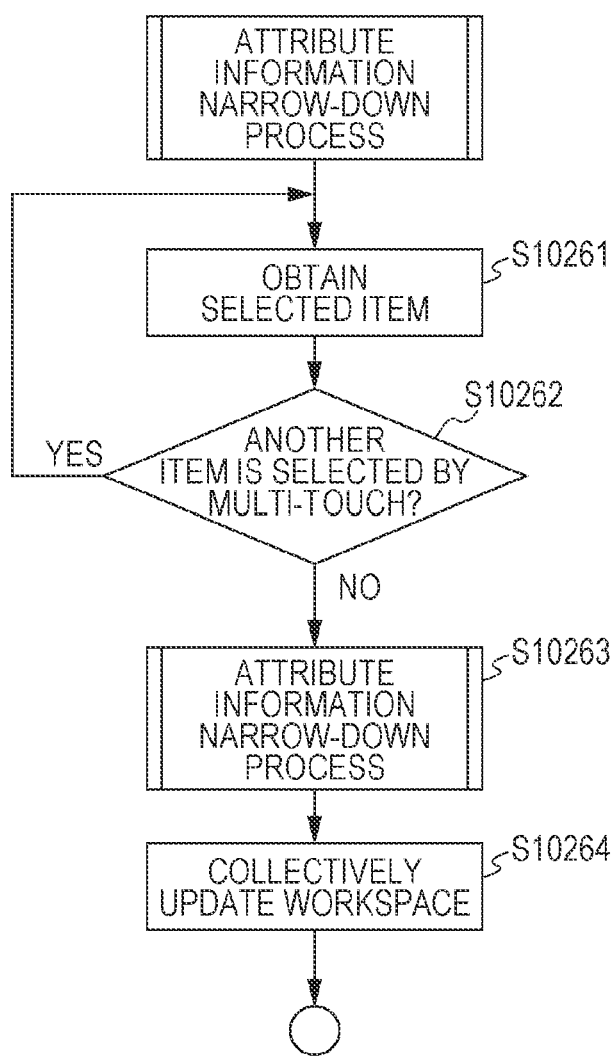
FIG. 6 is a fourth detailed flowchart illustrating a process according to the exemplary embodiment.

FIG. 6 is a flowchart illustrating the details of the attribute information narrow-down process (S1026).

First, the CPU 10 obtains a selected item (S10261). Specifically, if a flick operation is performed in the attribute information display mode, the CPU 10 obtains, as a selected item, a flicked item included in the file information.

Subsequently, the CPU 10 determines whether or not another item is selected by multi-touch (S10262). If a multi-touch flick operation is performed, the CPU 10 obtains a selected item again. For example, if a flick operation is performed using a forefinger and a middle finger, the CPU 10 selects the item flicked by the forefinger and also selects the item flicked by the middle finger.

After obtaining the selected item or items, the CPU 10 performs an attribute information narrow-down process (S10263) and collectively updates the workspace (S10264). That is, the CPU 10 extracts, from among pieces of attribute information, only one or more pieces of attribute information including an item that matches the selected item or items, and displays the extracted pieces of attribute information on the screen.

Figure 7:
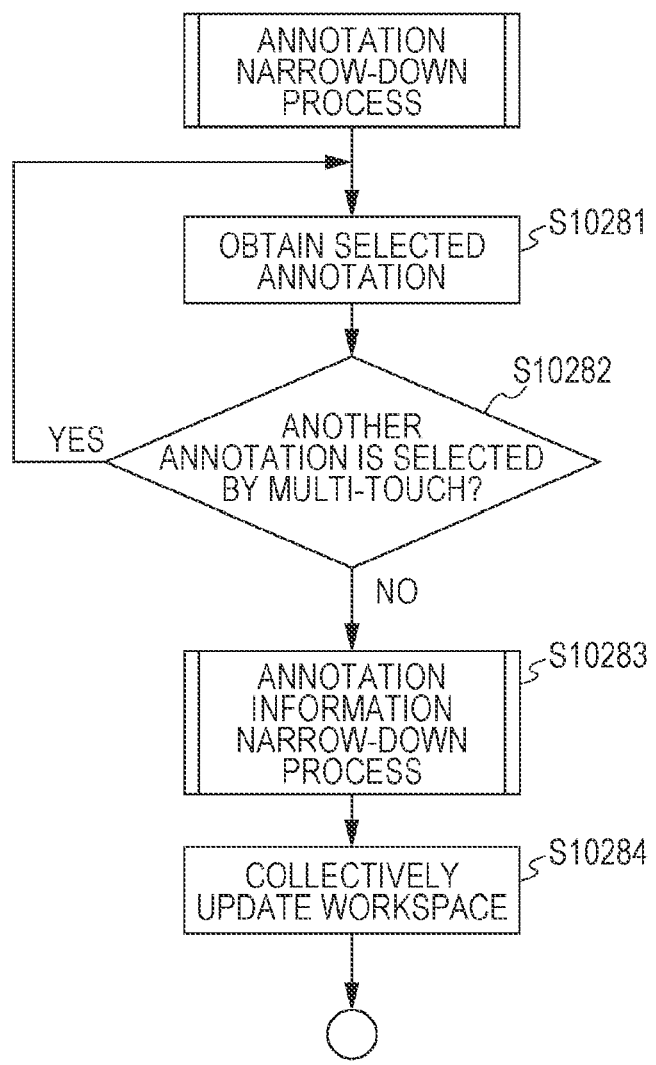
FIG. 7 is a fifth detailed flowchart illustrating a process according to the exemplary embodiment.

FIG. 7 is a flowchart illustrating the details of the annotation narrow-down process (S1028).

First, the CPU 10 obtains a selected annotation (S10281). Specifically, if a flick operation is performed in the annotation information display mode, the CPU 10 regards a flicked annotation as a selected annotation, and obtains the information thereof.

Subsequently, the CPU 10 determines whether or not another annotation is selected by multi-touch (S10282). If a multi-touch flick operation is performed, the CPU 10 obtains a selected annotation again. For example, if a flick operation is performed using a forefinger and a middle finger, the CPU 10 selects the annotation flicked by the forefinger and also selects the annotation flicked by the middle finger.

After obtaining the selected annotation or annotations, the CPU 10 performs an annotation narrow-down process (S10283) and collectively updates the workspace (S10284). That is, the CPU 10 extracts, from among thumbnails, only one or more thumbnails having an annotation that matches the selected annotation or annotations, and displays them on the screen.

Figure 8:
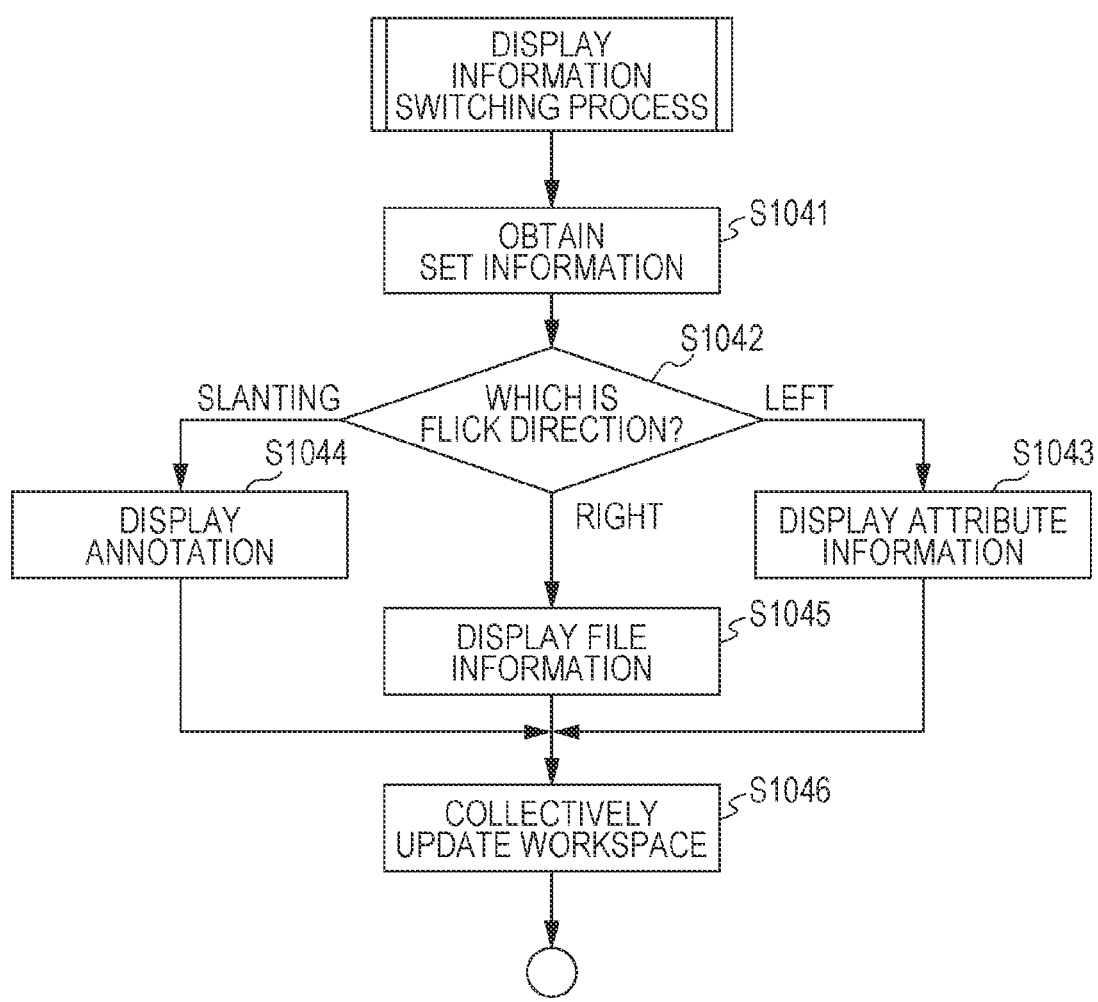
FIG. 8 is a sixth detailed flowchart illustrating a process according to the exemplary embodiment.

FIG. 8 is a flowchart illustrating the details of the display information switching process (S104). This flowchart is also applied to S105.

First, the CPU 10 obtains set information that is set as a program in advance (S1041). Specifically, the set information is information that associates flick directions and display modes with each other. Examples of the set information are as follows.

Flick operation in the right direction: display file information

Flick operation in the left direction: display attribute information

Flick operation in the slanting direction: display annotation

Subsequently, the CPU 10 determines the flick direction (S1042). If the flick direction is the left direction, the CPU 10 displays attribute information (S1043). If the flick direction is the right direction, the CPU 10 displays file information (S1045). If the flick direction is the slanting direction, the CPU 10 displays an annotation (S1044). After that, the CPU 10 updates the workspace (S1046).

Figure 9:
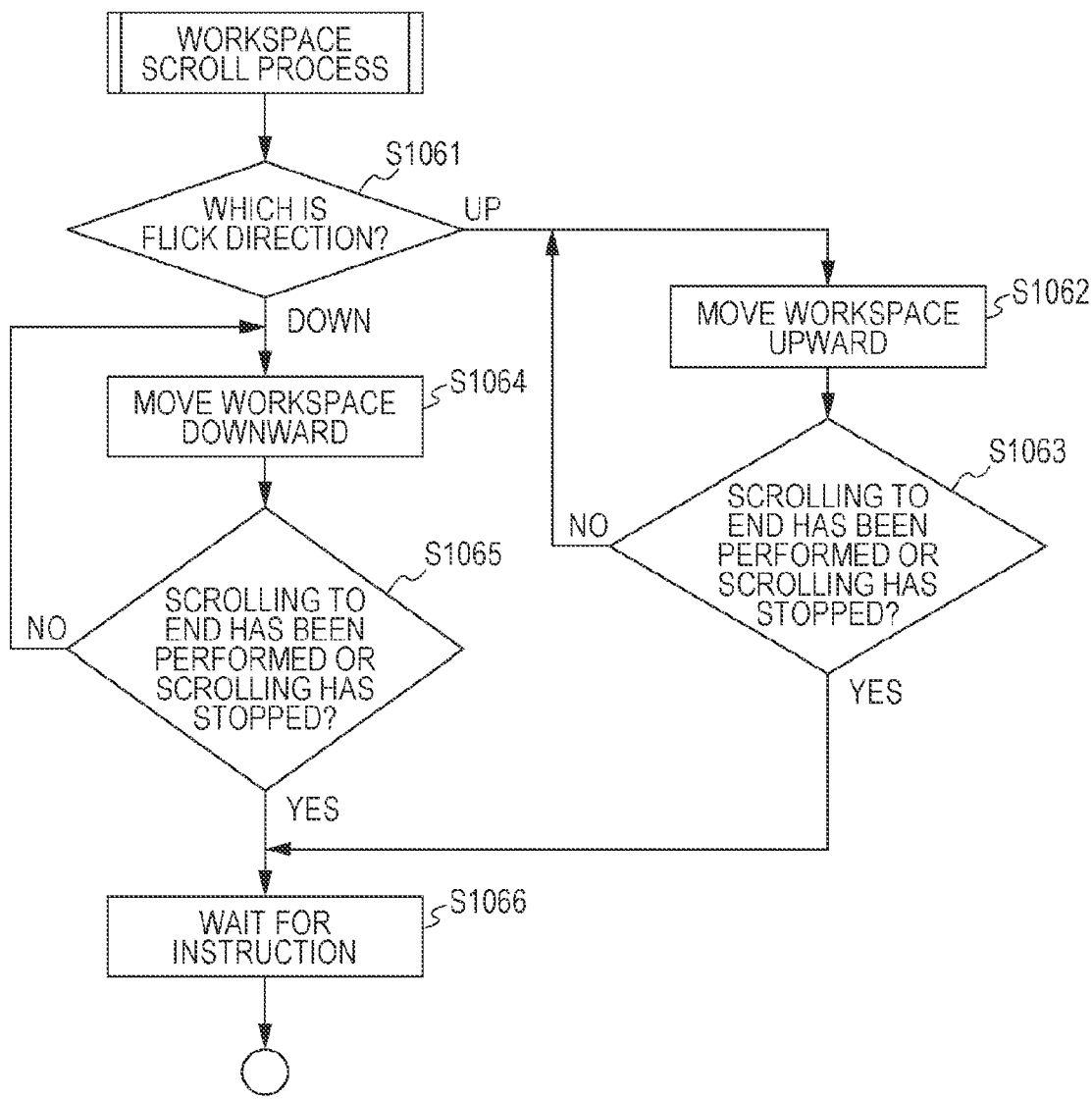
FIG. 9 is a seventh detailed flowchart illustrating a process according to the exemplary embodiment.

FIG. 9 is a flowchart illustrating the details of the workspace scroll process (S106).

First, the CPU 10 determines the flick direction (S1061). If the flick direction is the upward direction, the CPU 10 moves the workspace upward (S1062). Subsequently, the CPU 10 determines whether or not scrolling to the end has been performed or scrolling has stopped (S1063). If scrolling to the end has been performed or scrolling has stopped, the CPU 10 waits for the next flick operation (S1066).

If the flick direction is the downward direction, the CPU 10 moves the workspace downward (S1064). Subsequently, the CPU 10 determines whether or not scrolling to the end has been performed or scrolling has stopped (S1065). If scrolling to the end has been performed or scrolling has stopped, the CPU 10 waits for the next flick operation (S1066).

Figure 10:
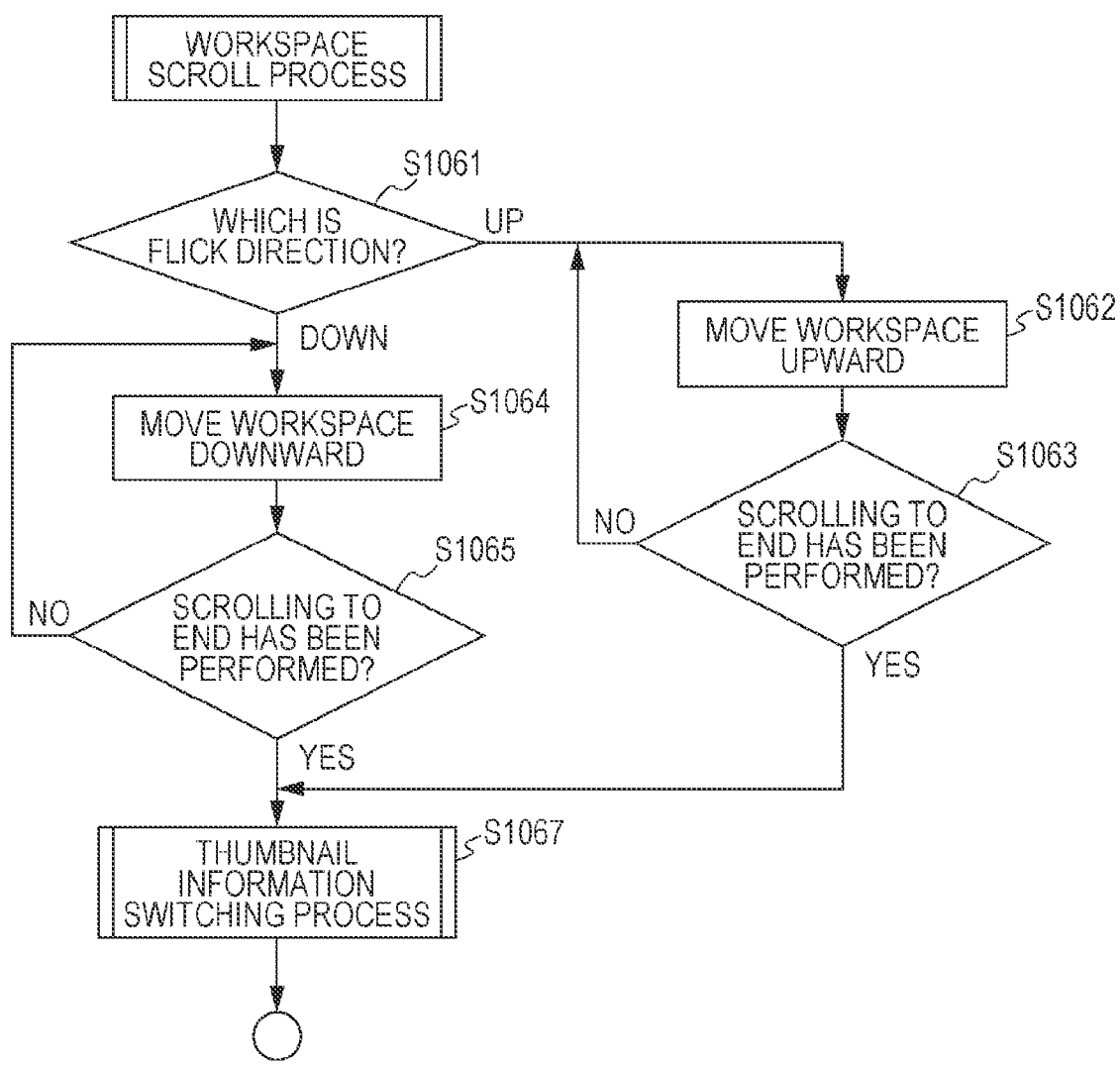
FIG. 10 is an eighth detailed flowchart illustrating a process according to the exemplary embodiment.

FIG. 10 is another flowchart illustrating the details of the workspace scroll process (S106).

Steps S1061 to S1065 are the same as those in the flowchart illustrated in FIG. 9. In a case where scrolling to the end has been performed, the CPU 10 does not wait for the next flick operation, but executes a thumbnail information switching process (S1067). This process is similar to the display information switching process illustrated in FIG. 8, in which the mode is switched from the thumbnail display mode to the file information display mode or the attribute display mode. For example, if a flick operation is performed in the downward direction after scrolling to the end in the downward direction has been performed, file information is displayed.

The flowchart in FIG. 5 illustrating the details of the file information narrow-down process (S1024) may be replaced by a flowchart of another process.

Figure 11:
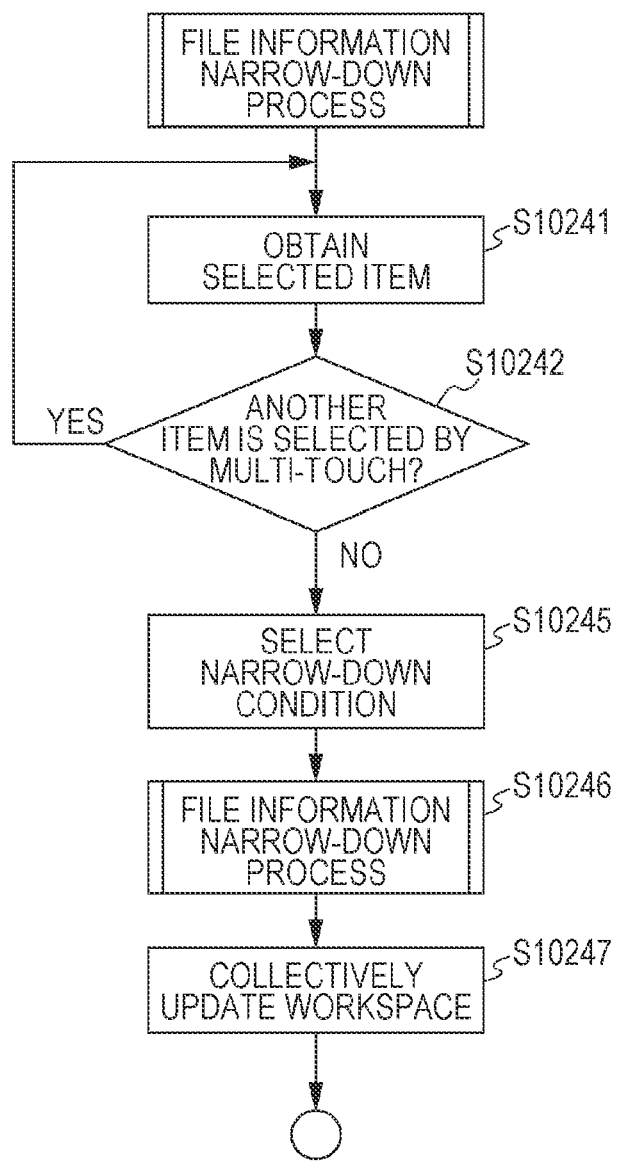
FIG. 11 is a ninth detailed flowchart illustrating a process according to the exemplary embodiment.

FIG. 11 is another flowchart illustrating the details of the file information narrow-down process (S1024). Steps S10241 to S10242 are the same as those in FIG. 5. After a selected item has been obtained, a narrow-down condition is selected (S10245). For example, if two items have been selected, it is determined whether the two items are to be narrowed down by applying an AND condition or an OR condition. A pop-up menu is displayed and the user taps to select either of them. The subsequent steps are the same as in FIG. 5, that is, the file information narrow-down process is performed (S10246) and the workspace is collectively updated (S10247).

Figure 12:
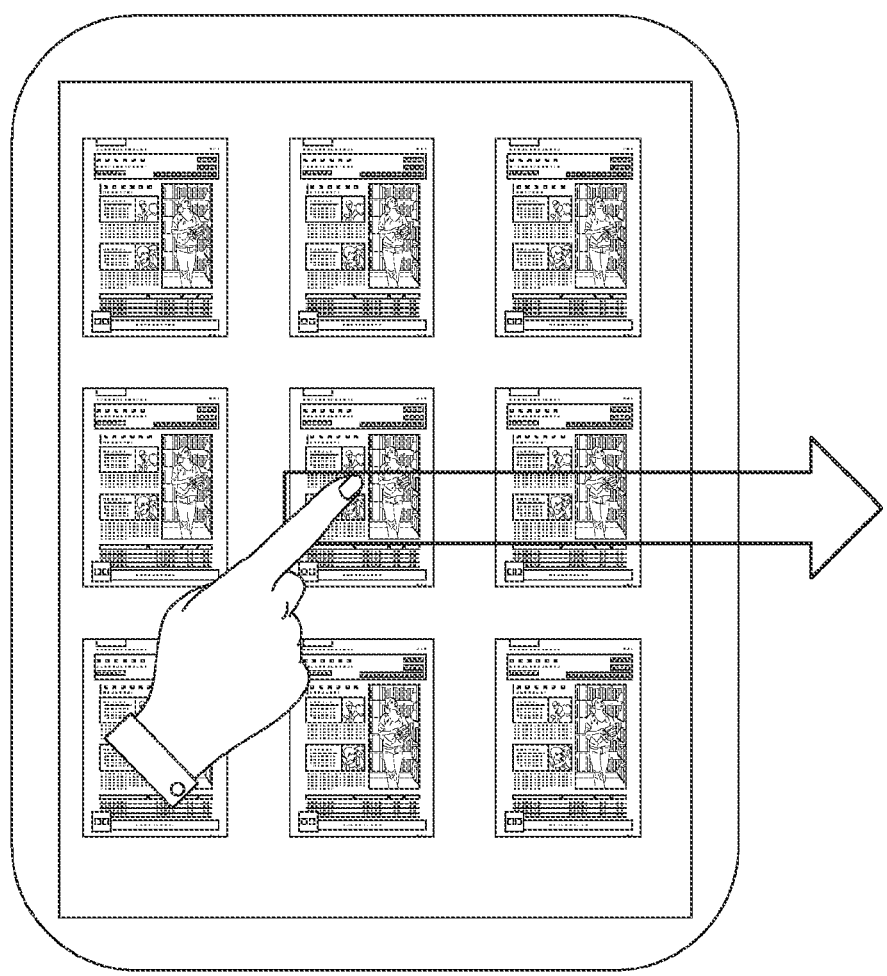
FIG. 12 is a first example of a screen according to the exemplary embodiment.

Next, the processes according to the exemplary embodiment will be described in more detail by using examples of the screen displayed on the touch panel 16. Flick operation in right or left direction FIG. 12 illustrates an example of a screen on which a list of thumbnails of documents is displayed. This screen is displayed, for example, when a user selects a certain folder or directory. The CPU 10 reads out, from the image data memory 18, documents selected by the user or documents corresponding to a keyword, creates the thumbnails thereof and temporarily stores them in the working memory 14, and displays them on the touch panel 16. For example, the CPU 10 creates the thumbnails by reducing pieces of image data of first pages of individual documents. It may be difficult to find a desired document from such a list of thumbnails of documents. If the total number of thumbnails of documents is limited so that all the thumbnails are displayed within the range of the screen, it may not so difficult to find a desired document. Otherwise, it may be necessary for the user to flick the screen in the upward or downward direction to scroll it, and display thumbnails of new documents. If a desired document is not found, it may be necessary for the user to repeat a similar operation.

If a flick operation in the upward or downward direction is performed on the screen illustrated in FIG. 12, the screen is scrolled as in the related art. If a large flick operation in the right direction is performed, the CPU 10 displays pieces of file information on individual documents displayed as thumbnails on the touch panel 16.

Figure 13:
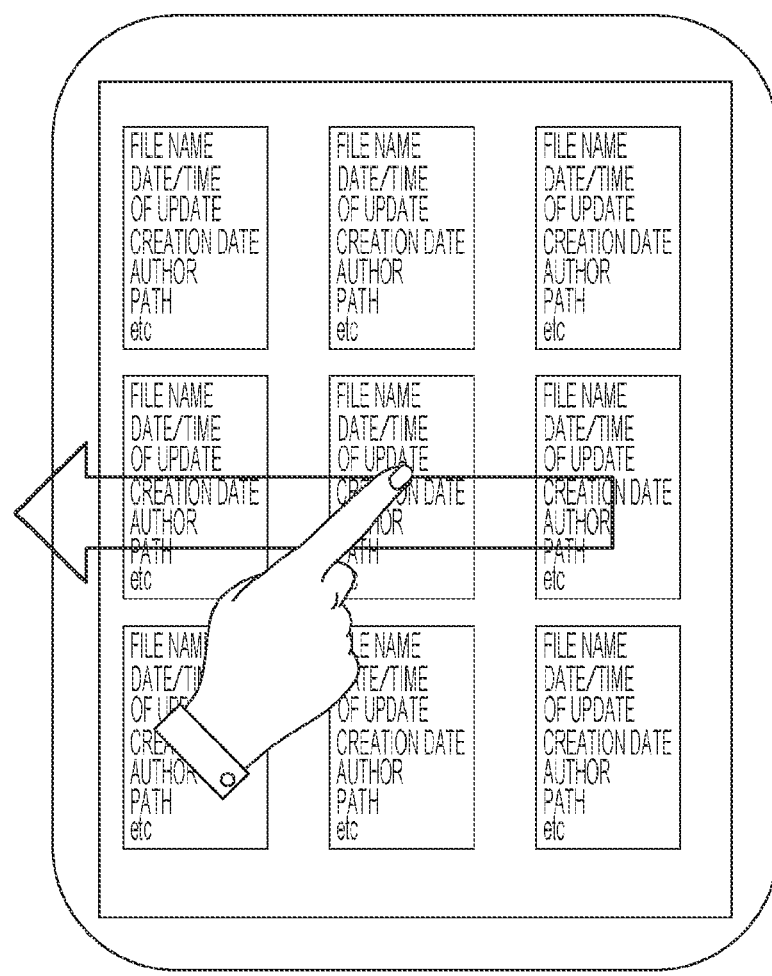
FIG. 13 is a second example of a screen according to the exemplary embodiment.

FIG. 13 illustrates an example of a screen on which pieces of file information on documents are displayed in response to a flick operation in the right direction. The CPU 10 detects the position and direction of the flick operation performed by the user. If the CPU 10 determines that the flick operation is a large flick operation in the right direction over an area larger than the display area of one thumbnail, the CPU 10 reads out pieces of file information on documents stored in the image data memory 18, and displays, for each of the documents displayed as thumbnails, the read out file information (file name, date/time of update, creation date, author, etc.) on the touch panel 16. The CPU 10 may read out the pieces of file information on documents displayed as thumbnails from the image data memory 18 and store them in the working memory 14 in advance, and may read out necessary pieces of file information from the working memory 14 to display them on the touch panel 16. The positions where the pieces of file information are displayed correspond to the positions where the thumbnails of the documents are displayed in FIG. 12. In other words, a list of pieces of file information is displayed while the display positions of the thumbnails of the documents are maintained. Accordingly, the user may easily compare the thumbnails of the documents with the pieces of file information on the documents. For example, in FIG. 12, a thumbnail of a certain document is displayed at upper right of the screen, and the file information on the document is displayed at the corresponding position at upper right of the screen. The user may easily check the file information on a desired document only by performing a large flick operation in the right direction.

Figure 14:
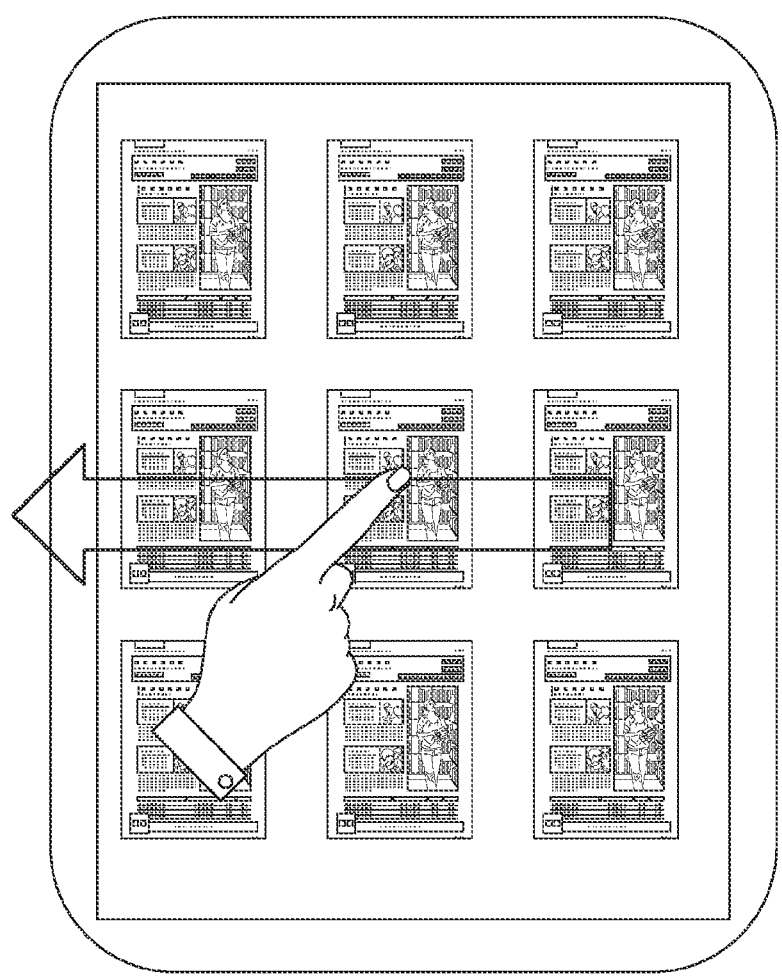
FIG. 14 is a third example of a screen according to the exemplary embodiment.

On the other hand, if a flick operation in the left direction is performed on the screen illustrated in FIG. 13, the CPU 10 detects the position and direction of the flick operation performed by the user. If the CPU 10 determines that the flick operation is a large flick operation in the left direction over an area larger than the display area of one thumbnail, the CPU 10 displays a screen showing a list of thumbnails of documents on the touch panel 16 again as illustrated in FIG. 14. If a flick operation in the left direction is further performed on the screen illustrated in FIG. 14 (or the screen illustrated in FIG. 12), the CPU 10 detects the flick operation performed by the user and the direction of the flick operation. If the CPU 10 determines that the direction of the flick operation is the left direction, the CPU 10 reads out pieces of attribute information on the documents stored in the image data memory 18, and displays, for each document displayed as a thumbnail, the read out attribute information (user attribute, date, whether or not the document has been transmitted by fax, etc.) on the touch panel 16.

Figure 15:
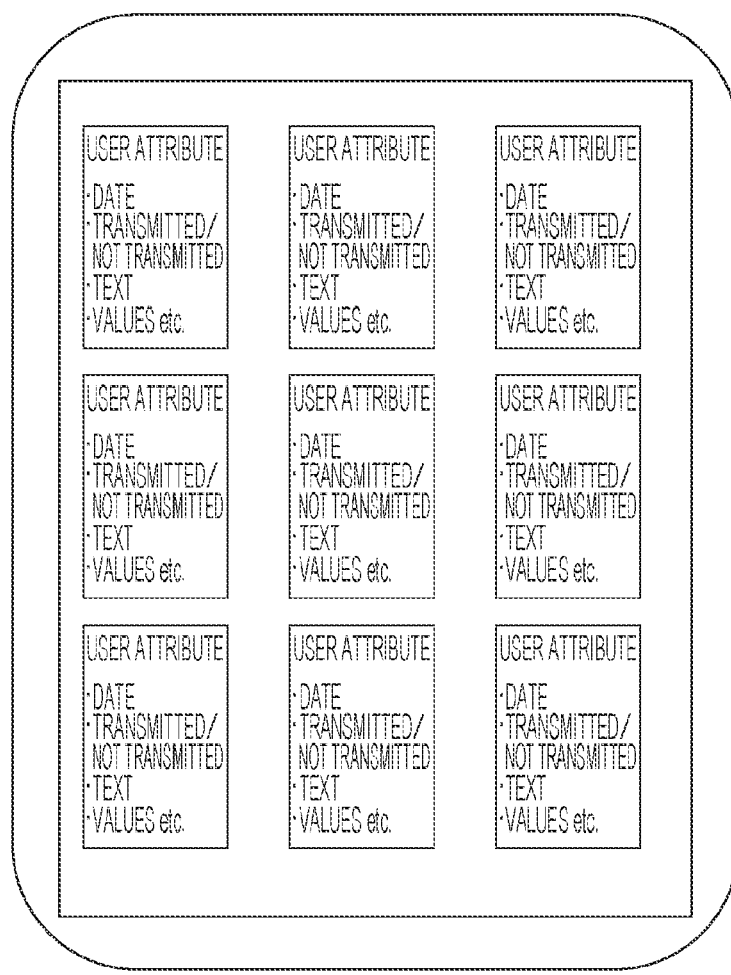
FIG. 15 is a fourth example of a screen according to the exemplary embodiment.

FIG. 15 illustrates an example of a screen on which pieces of attribute information on documents are displayed in response to a flick operation in the left direction. For each document displayed as a thumbnail, attribute information on the document (user attribute, date, whether or not the document has been transmitted by fax, values, etc.) is displayed. The positions where the pieces of attribute information on the documents are displayed correspond to the positions where the thumbnails of the documents are displayed in FIG. 12. Accordingly, the user may easily compare the thumbnails of the documents with the pieces of attribute information on the documents.

Scrolling of a screen by a flick operation in the upward or downward direction, and going on to the next screen or going back to the preceding screen by a flick operation in the right or left direction are commonly performed as basic operations of a PC, a tablet terminal, a smart phone, or the like. Note that, in the exemplary embodiment, a flick operation in the right or left direction causes a screen to be switched to a screen showing detailed information on the currently displayed thumbnails or icons. File information or attribute information on a document is metadata of the document, and the metadata of the document is displayed in response to a flick operation in the right or left direction. Also, file information or attribute information on a document is data in a layer lower by one than data of the document in a hierarchical structure, and the data in a layer lower than the document is displayed in response to a flick operation in the right or left direction.

Figure 16:
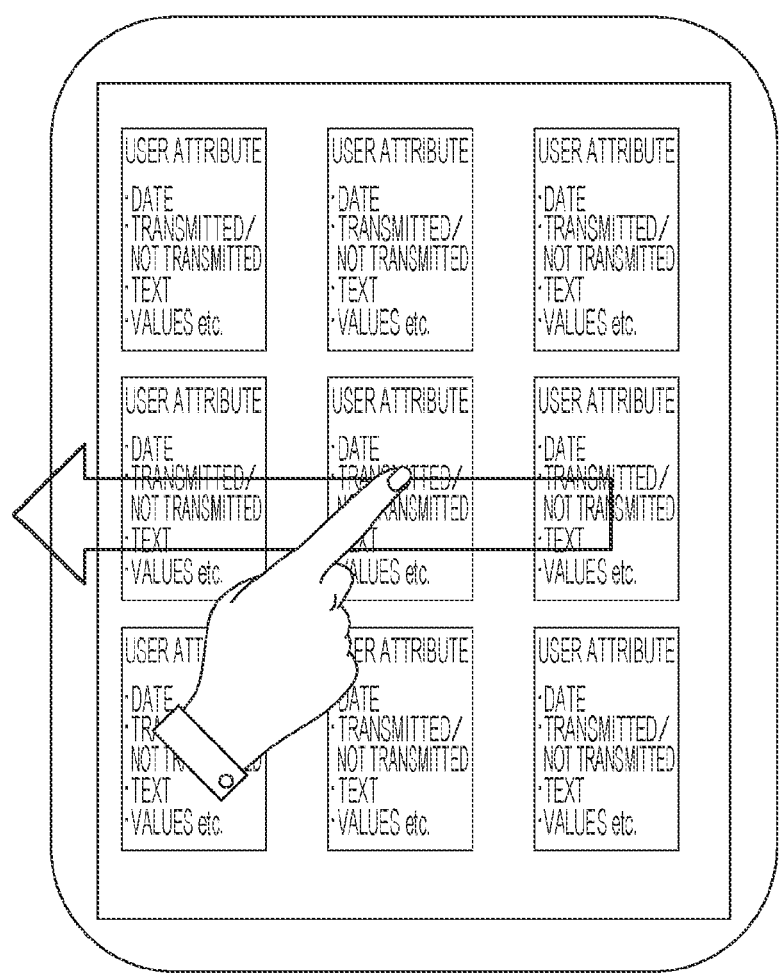
FIG. 16 is a fifth example of a screen according to the exemplary embodiment.
Figure 17:
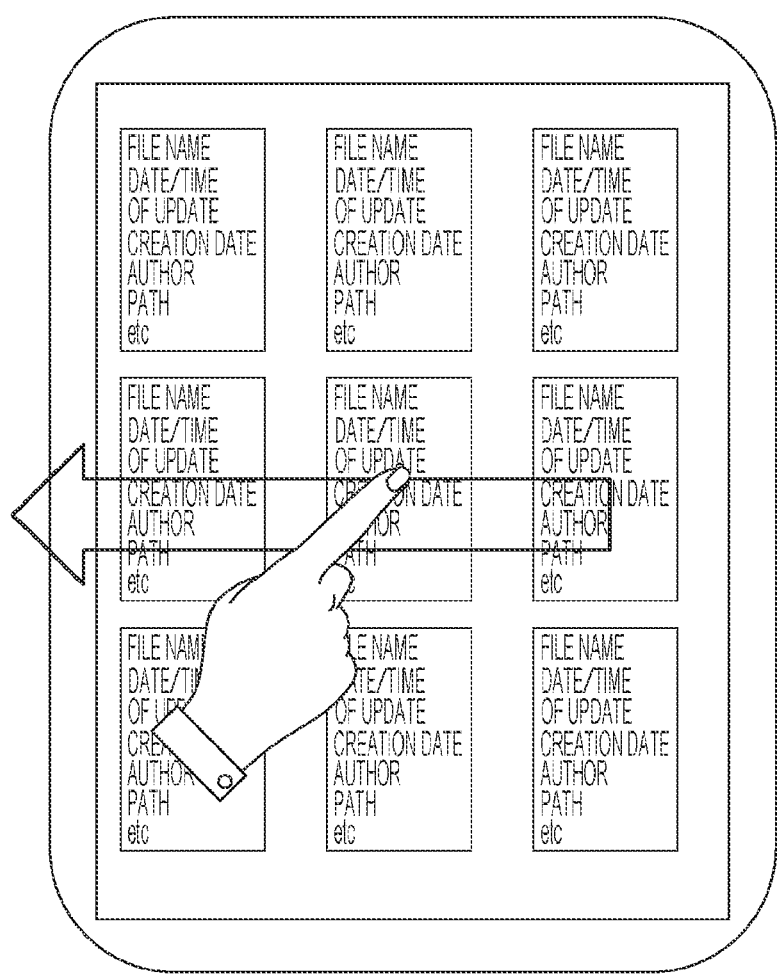
FIG. 17 is a sixth example of a screen according to the exemplary embodiment.

On the screen illustrated in FIG. 15, if a flick operation in the left direction is further performed as illustrated in FIG. 16, the CPU 10 may display pieces of file information on the documents as illustrated in FIG. 17. This screen is the same as the screen illustrated in FIG. 13. If a flick operation in the left direction is further performed on the screen illustrated in FIG. 17, the CPU 10 displays the screen showing a list of thumbnails of the documents again.

That is, if the user continues to perform a flick operation in the left direction, the CPU 10 changes the screen in the following order in accordance with the direction of the flick operation:

Screen showing a list of thumbnails of documents→Screen showing attribute information→Screen showing file information→Screen showing a list of thumbnails of documents→ . . . .

Likewise, if the user continues to perform a flick operation in the right direction, the CPU 10 changes the screen in the following order in accordance with the direction of the flick operation:

Screen showing a list of thumbnails of documents→Screen showing file information→Screen showing attribute information→Screen showing a list of thumbnails of documents→ . . . .

In the exemplary embodiment, the screen is sequentially changed in the above-described manner. Alternatively, if a flick operation in the left direction is performed, the screen may be changed in the following order, without going back to the initial screen:

Screen showing a list of thumbnails of documents→Screen showing attribute information→Screen showing file information.

Likewise, if a flick operation in the right direction is performed, the screen may be changed in the following order, without going back to the initial screen:

Screen showing a list of thumbnails of documents→Screen showing file information→Screen showing attribute information.

In this way, the CPU 10 displays the screen showing a list of thumbnails of documents, the screen showing file information, and the screen showing attribute information on the touch panel 16 in a switching manner in accordance with the direction of a flick operation. Accordingly, the user may visually identify thumbnail information, file information, and attribute information on documents only by performing flick operations, and may find a desired document by using these pieces of information. The correspondence between a flick direction and a screen to be displayed is determined by a processing program in advance. Alternatively, a user may appropriately customize the correspondence. For example, a flick operation in the right direction may be associated with attribute information, and a flick operation in the left direction may be associated with file information. The correspondence customized by the user is stored in the program memory 12.

Flick Operation in Upward or Downward Direction

Figure 18:
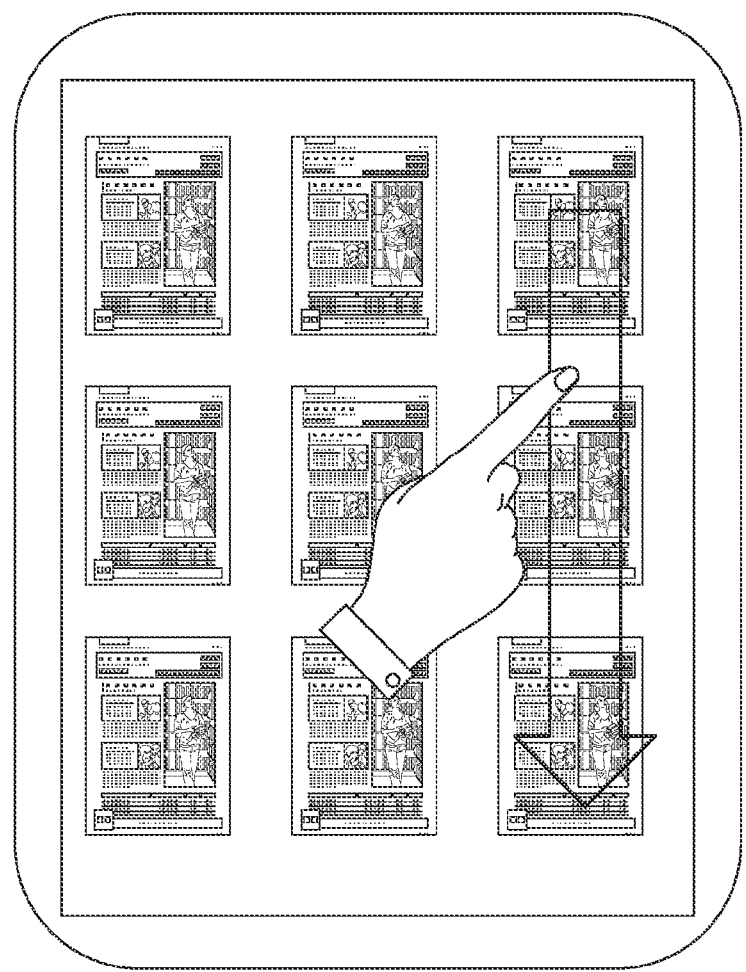
FIG. 18 is a seventh example of a screen according to the exemplary embodiment.

FIG. 18 illustrates a state where a flick operation in the downward direction has been performed on a screen showing a list of thumbnails of documents, and scrolling to the end has been performed. On this screen, if a flick operation in the downward direction is further performed, the CPU 10 determines that a flick operation in the downward direction at the end of the screen has been performed, reads out pieces of file information stored in the image data memory 18, and displays them on the touch panel 16.

Figure 19:
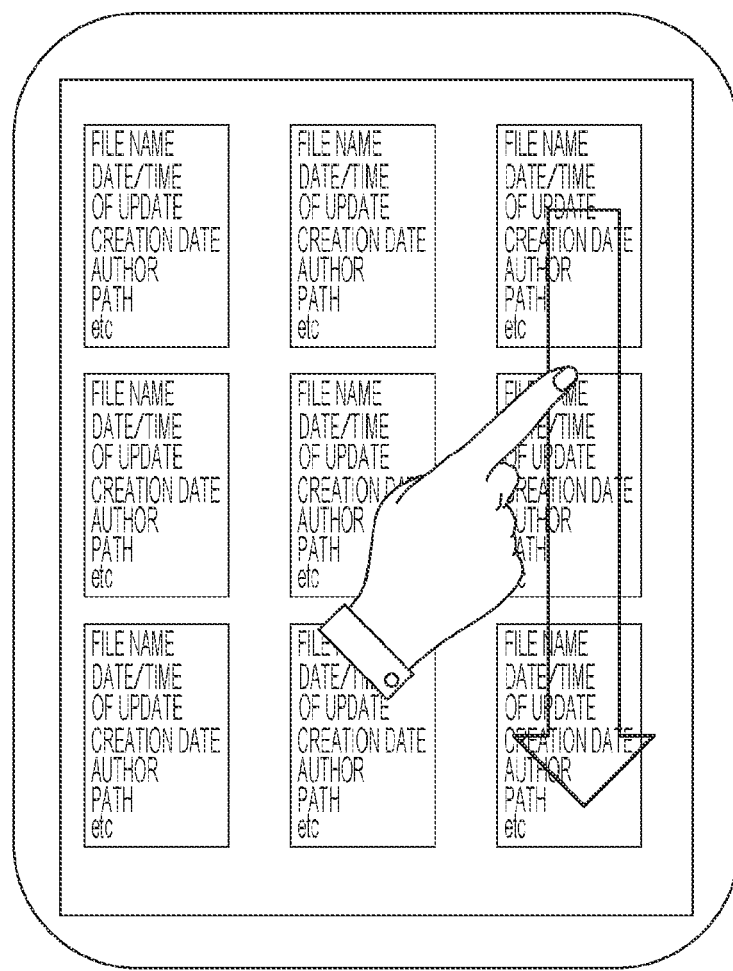
FIG. 19 is an eighth example of a screen according to the exemplary embodiment.

FIG. 19 illustrates an example of a screen on which the pieces of file information on the documents are displayed in response to the flick operation in the downward direction. For each document displayed as a thumbnail, the file information on the document is displayed. The positions where the pieces of file information on the documents are displayed correspond to the positions where the thumbnails of the documents are displayed in FIG. 18. Accordingly, the user may easily compare the thumbnails of the documents with the pieces of file information on the documents. On this screen, if a flick operation is further performed, the CPU 10 scrolls the file information screen to display the screen. If a flick operation in the downward direction is further performed after scrolling to the end has been performed, the CPU 10 detects the flick operation, reads out pieces of attribute information from the image data memory 18, and displays the pieces of attribute information on the touch panel 16.

Figure 20:
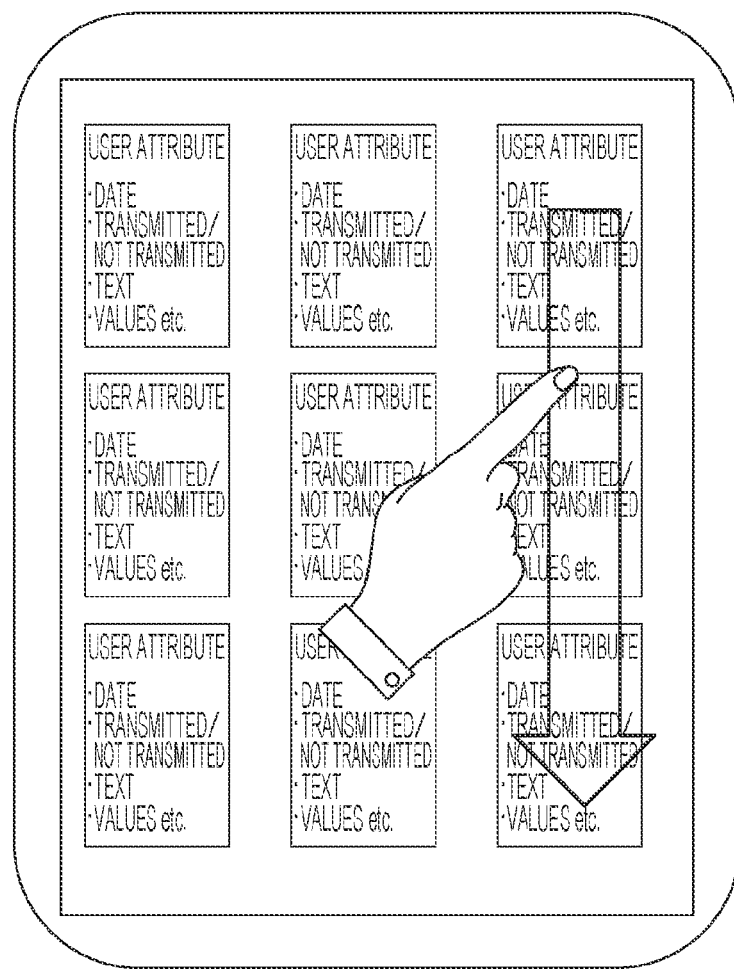
FIG. 20 is a ninth example of a screen according to the exemplary embodiment.

FIG. 20 illustrates an example of a screen on which the pieces of attribute information on the documents are displayed in response to a flick operation in the downward direction. For each document displayed as a thumbnail, a piece of attribute information on the document is displayed. The positions where the pieces of attribute information on the documents are displayed correspond to the positions where the thumbnails of the documents are displayed. Accordingly, the user may easily compare the thumbnails of the documents with the pieces of attribute information on the documents.

In this way, if a flick operation in the downward direction is performed, the CPU 10 changes the screen in the following order:

Screen showing a list of thumbnails of documents→Scroll→ . . . →Scroll (to the end)→File information→Scroll→ . . . →Scroll (to the end)→Attribute information→Scroll • . . . →Scroll (to the end).

Accordingly, thumbnails, file information, and attribute information of documents are displayed only by performing flick operations in the downward direction, and the user may find a desired document only by performing a flick operation. Alternatively, if a flick operation in the downward direction is further performed on the screen illustrated in FIG. 20, the CPU 10 may change the screen by changing the screen to the screen illustrated in FIG. 18.

In-Thumbnail Flick Operation

A description has been given of a flick operation over an area larger than the display area of one thumbnail, for example, a flick operation for the entire screen. Hereinafter, a description will be given of a process in a case where a flick operation is performed within a specific area. Whether a flick operation has been performed within a specific area or for the entire screen is determined by the CPU 10 by detecting a slide range of the flick operation.

Figure 21:
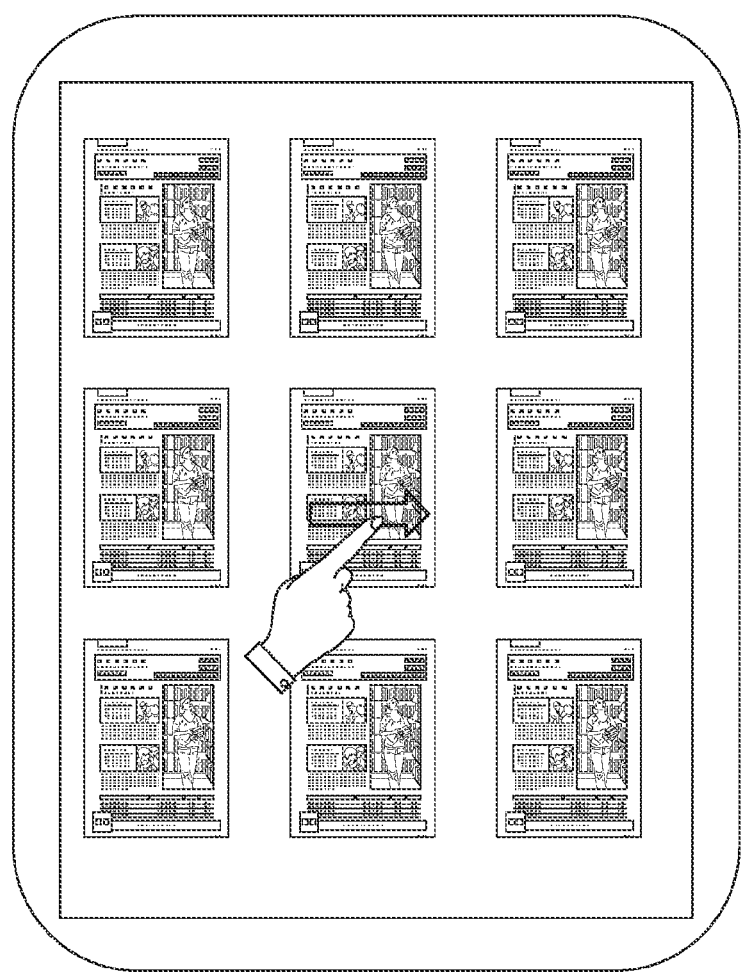
FIG. 21 is a tenth example of a screen according to the exemplary embodiment.
Figure 22:
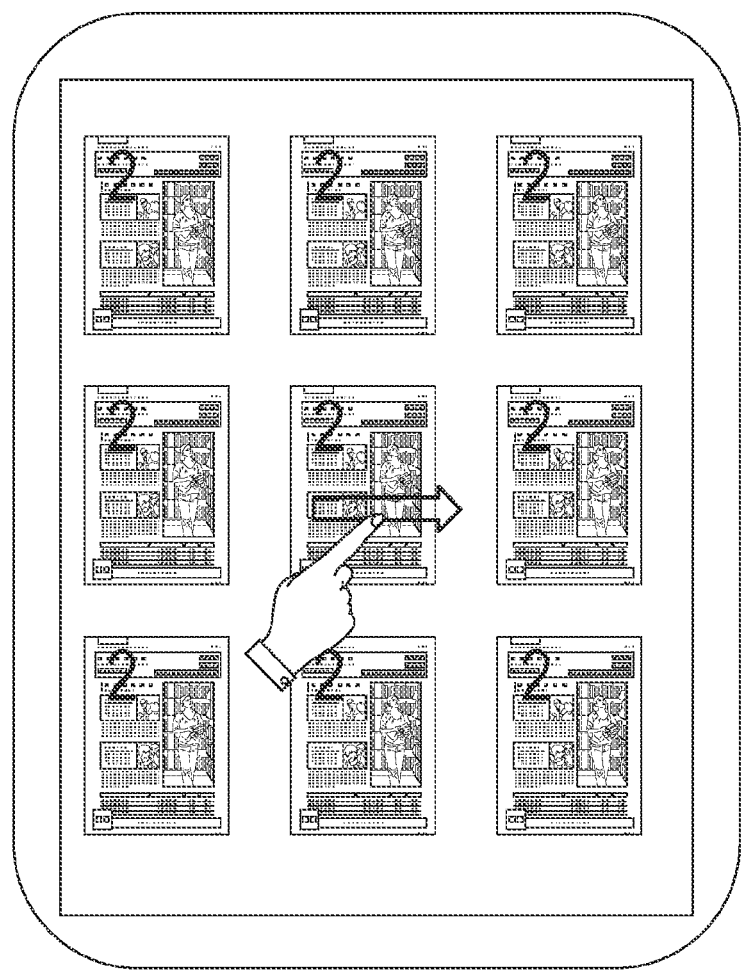
FIG. 22 is an eleventh example of a screen according to the exemplary embodiment.

FIG. 21 illustrates a state where a flick operation in the right direction is performed within a thumbnail on a screen showing a list of thumbnails of documents. If a flick operation is performed within a thumbnail, the CPU 10 determines that a flick operation within a thumbnail has been performed, identifies the page that is currently displayed, reads out image data of the ext pages of all the documents that are displayed as thumbnails from the image data memory 18, and reduces the image data to create thumbnails, as illustrated in FIG. 22. Subsequently, the CPU 10 stores the image data in the working memory 14 and displays it on the touch panel 16. In FIG. 22, "2" displayed on the thumbnail of each document represents that it is the thumbnail of the second page. The user may view the content of the next pages of all the documents only by performing one flick operation.

On the screen illustrated in FIG. 22, if a flick operation in the right direction is further performed within a thumbnail, the CPU 10 identifies the page that is currently displayed, reads out image data of the next pages (third pages) of all the documents that are displayed as thumbnails from the image data memory 18, reduces the image data to create thumbnails, and displays the thumbnails on the touch panel 16. The CPU 10 may create thumbnails of plural pages of documents and store the thumbnails in the working memory 14 within the capacity limit of the working memory 14 in advance, and, upon determining that a flick operation has been performed within a thumbnail, the CPU 10 may read out thumbnails of necessary pages from the working memory 14 and display the thumbnails on the touch panel 16.

Note that, in the exemplary embodiment, even if a user performs a flick operation within a thumbnail of a certain document among thumbnails of documents displayed on a screen, the thumbnails of all the documents displayed on the screen change to thumbnails of the next pages. The user may view the content of the next pages of all the documents only by performing one flick operation, without repeatedly performing flick operations within plural thumbnails.

Annotation Flick Operation

Figure 23:
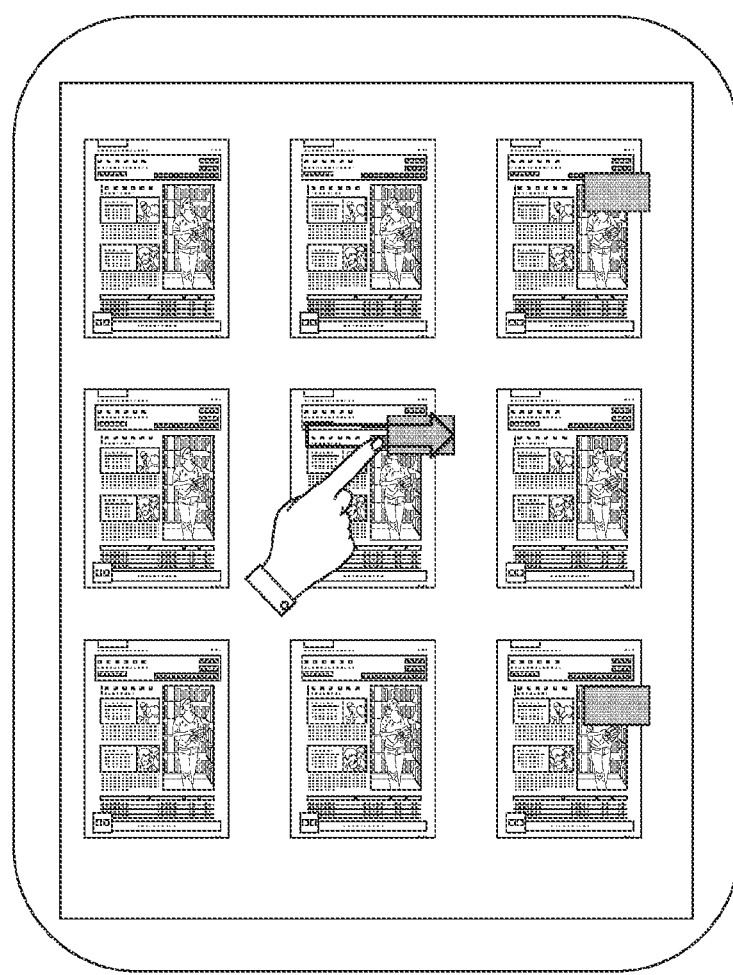
FIG. 23 is a twelfth example of a screen according to the exemplary embodiment.

FIG. 23 illustrates an example of a screen on which a tag serving as an annotation is added to a thumbnail of a document. On this screen, if a flick operation in the right direction is performed within the annotation (within the tag), the CPU 10 determines that a flick operation has been performed on the annotation, displays only thumbnails of documents to which a similar annotation (tag) is added, and hides the thumbnails of the other documents, as illustrated in FIG. 24.

Here, a "similar annotation" means an annotation whose shape or attribute match that of a certain annotation. For example, if there are plural shapes of annotations, annotations having the same shape are similar to each other, and, if there are plural colors of annotations, annotations having the same color are similar to each other. Further, if annotations include text data, annotations including the same text data are similar to each other. Thus, in FIG. 23, if there are plural colors of annotations and if the user flicks a red annotation, the CPU 10 determines that the red annotation has been flicked, displays only thumbnails of documents to which a red annotation is added on the screen, and erases the thumbnails of the other documents. On the screen illustrated in FIG. 24, the user may easily identify only documents to which desired annotations are added.

Figure 24:
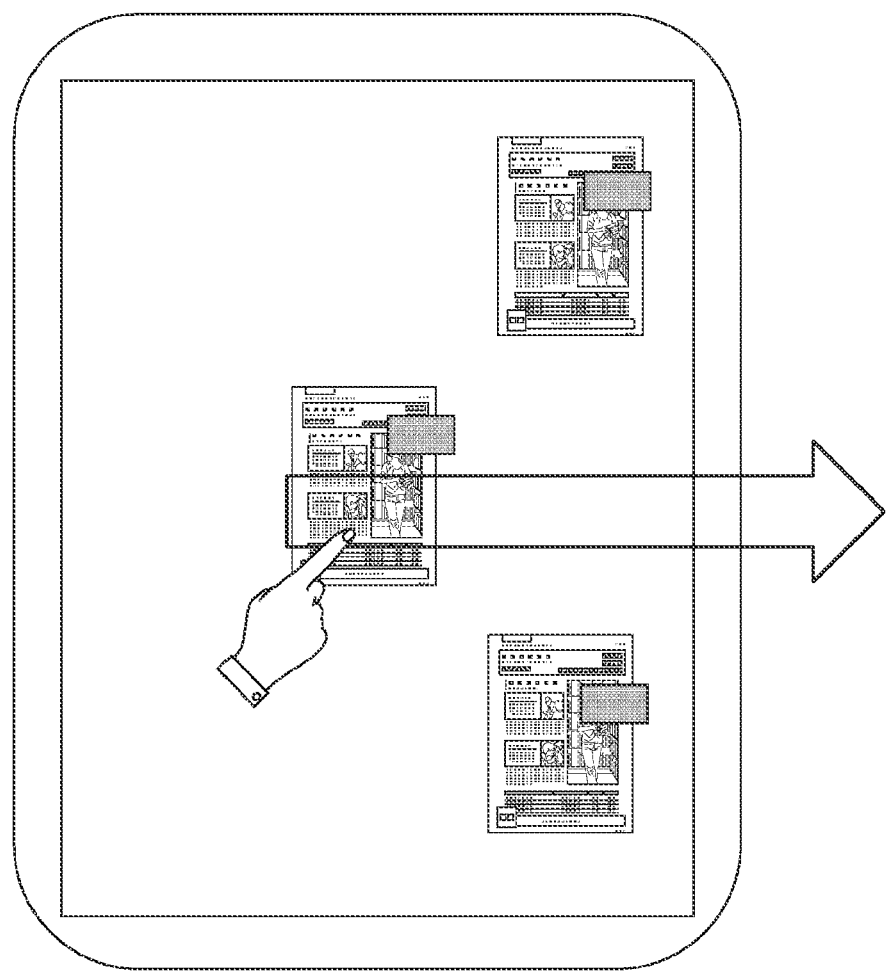
FIG. 24 is a thirteenth example of a screen according to the exemplary embodiment.
Figure 25:
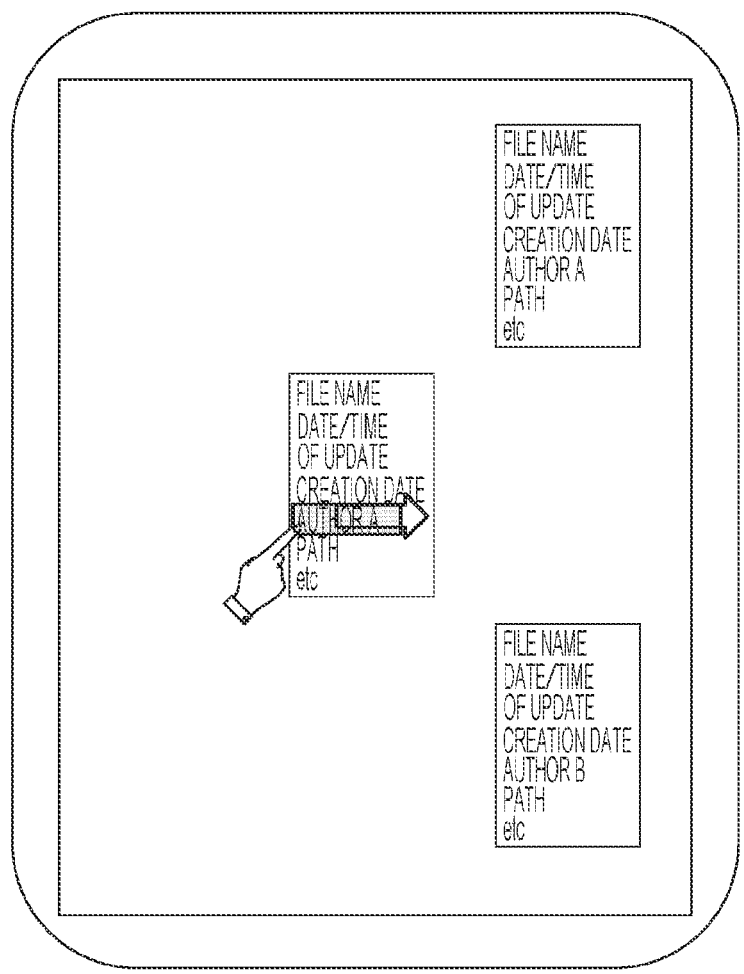
FIG. 25 is a fourteenth example of a screen according to the exemplary embodiment.

On the screen illustrated in FIG. 24, if a flick operation in the right direction is performed on the entire screen, the CPU 10 determines that a flick operation has been performed over an area larger than the display area of one thumbnail, and, under the assumption that the current screen is a screen showing a list of thumbnails of documents, reads out pieces of file information on the documents that are currently displayed from the image data memory 18 and displays the pieces of file information, as illustrated in FIG. 25. The current screen mode may be stored, for example, as a mode parameter in the working memory 14. Every time the screen is changed, the CPU 10 updates the mode parameter in conjunction with the change of the screen. The user may easily identify the pieces of file information on documents obtained through narrowing-down performed by a flick operation on an annotation.

If a flick operation in the right direction is further performed on the entire screen illustrated in FIG. 25, the CPU 10 determines that a flick operation has been performed over an area larger than the display area of one thumbnail, and, under the assumption that the current screen is a file information screen, the CPU 10 reads out attribute information from the image data memory 18 and displays the attribute information.

Figure 26:
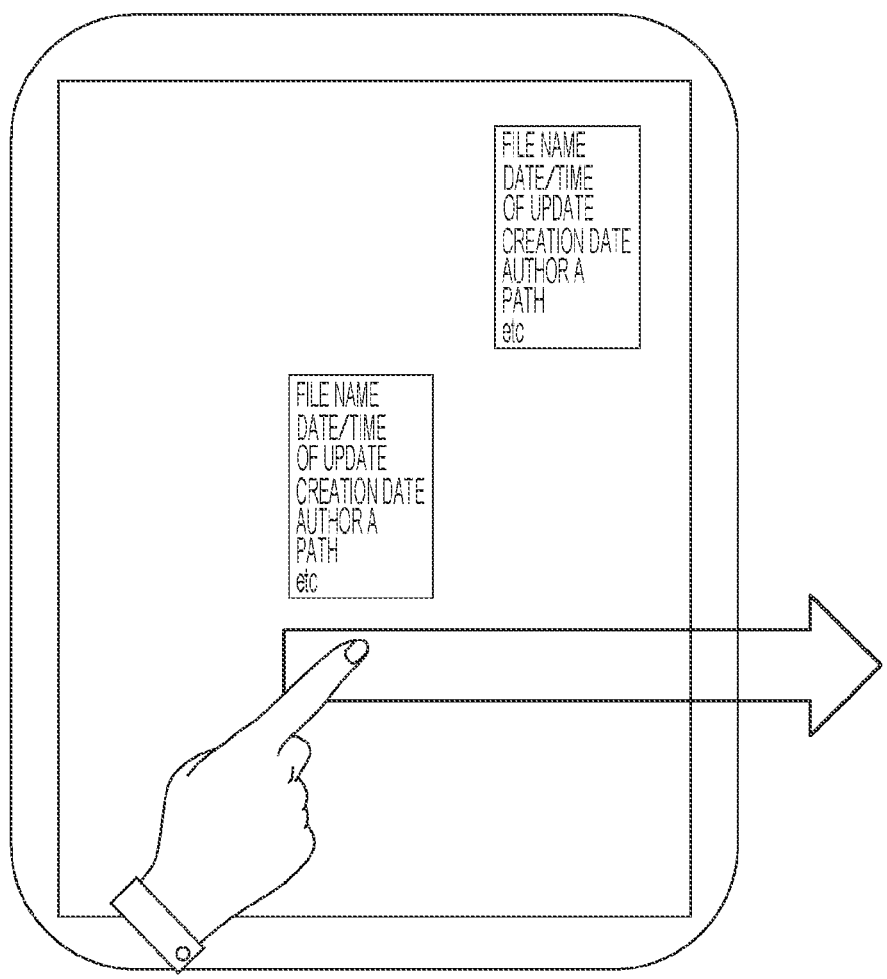
FIG. 26 is a fifteenth example of a screen according to the exemplary embodiment.

On the other hand, if a flick operation is performed within a thumbnail, not on the entire screen, on the screen illustrated in FIG. 25, specifically, if a flick operation is performed within a certain item of file information, the CPU 10 determines that a flick operation has been performed within a thumbnail, obtains the value of the flicked item, displays only pieces of file information on documents having the item of the same value, and hides the other pieces of file information. For example, if a flick operation is performed within an item "author A" in a piece of file information as illustrated in FIG. 25, the CPU 10 displays only pieces of file information having the item "author A" as illustrated in FIG. 26, and hides the other pieces of file information. Accordingly, the user may easily narrow down documents only by selecting a certain item and flicking the item. In the example illustrated in FIG. 26, three pieces of file information have been narrowed down to two pieces of file information. As the number of pieces of file information increases, the effect of narrowing down increases.

Figure 27:
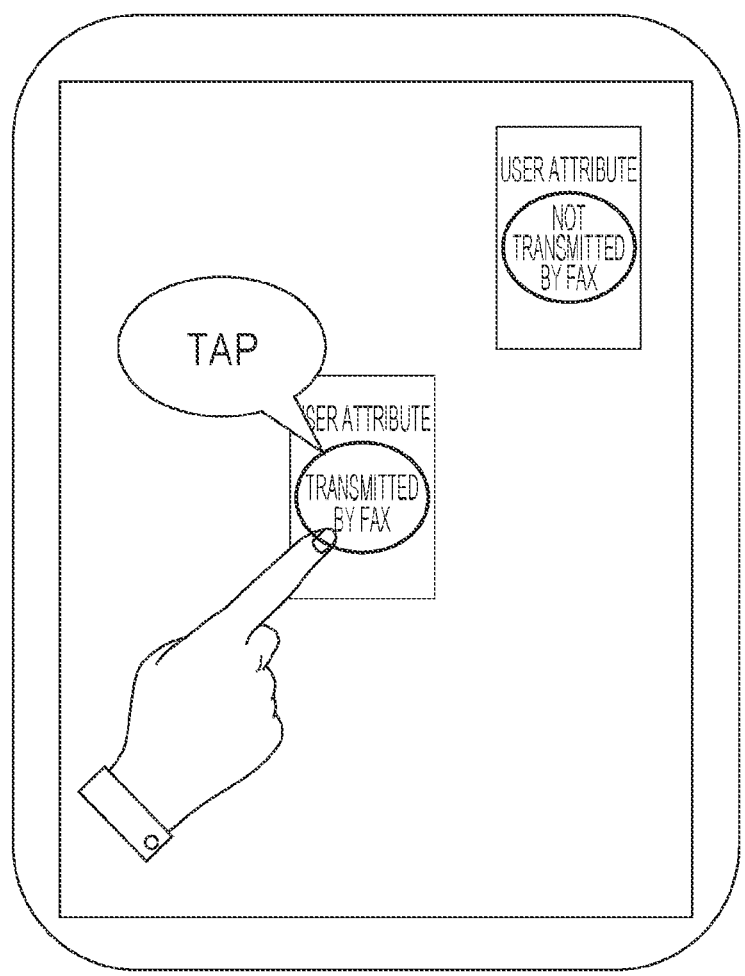
FIG. 27 is a sixteenth example of a screen according to the exemplary embodiment.
Figure 28:
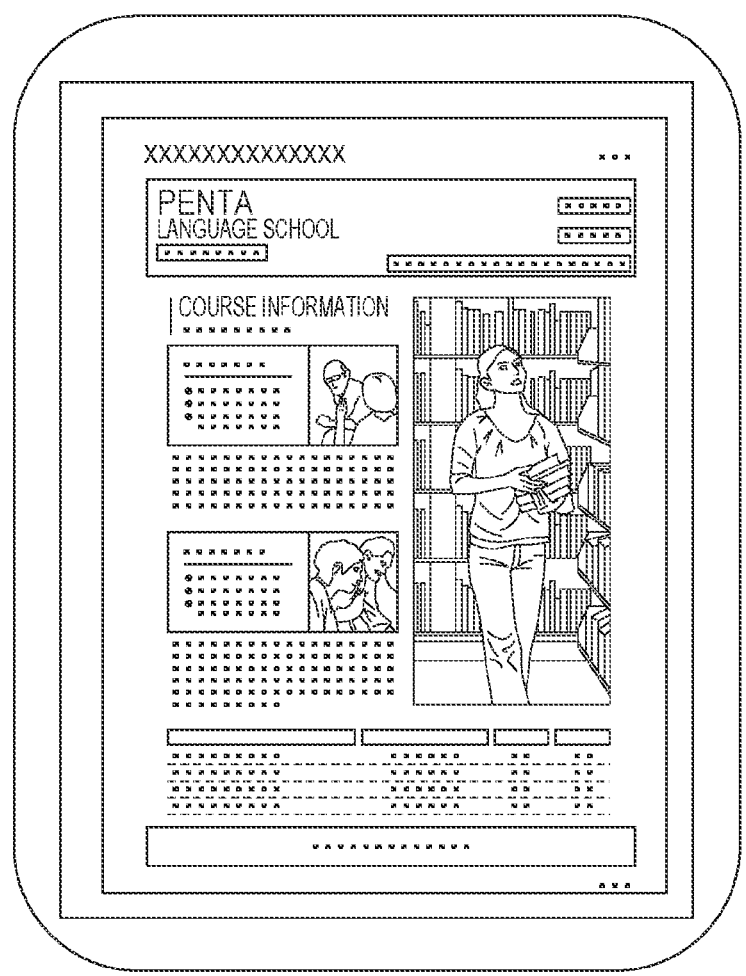
FIG. 28 is a seventeenth example of a screen according to the exemplary embodiment.

If a flick operation in the right direction is further performed on the entire screen illustrated in FIG. 26, the CPU 10 determines that a flick operation has been performed on the entire screen, and, under the assumption that the current screen is a file information screen, the CPU 10 reads out pieces of attribute information on the displayed documents and displays the pieces of attribute information, as illustrated in FIG. 27. The user may easily find a desired document by viewing the displayed pieces of attribute information. For example, on the screen illustrated in FIG. 27, if the pieces of attribute information on two documents are displayed, one of them indicates that the document has not been transmitted by fax, and the other indicates that the document has been transmitted by fax, the user may find a document that has been transmitted by fax, as a desired document. If the user finds a desired document and taps the document, the CPU 10 determines that a tap operation has been performed, reads out the detailed data about the document from the image data memory 18, and displays the detailed screen of the document as illustrated in FIG. 28.

In the exemplary embodiment, a flick operation in the right direction is performed on the entire screen illustrated in FIG. 24 so that pieces of file information are displayed, and a flick operation is further performed within a thumbnail of one of the pieces of file information. If a flick operation in the left direction is performed on the entire screen illustrated in FIG. 24, the CPU 10 displays pieces of attribute information. If a flick operation is further performed within a thumbnail of one of the pieces of attribute information, only pieces of attribute information having the item of the same value as the flicked item are displayed.

Multi-Touch Flick Operation

On the screen illustrated in FIG. 25, a multi-touch flick operation may be performed, instead of a flick operation in which only one item in file information or attribute information is flicked.

Figure 29:
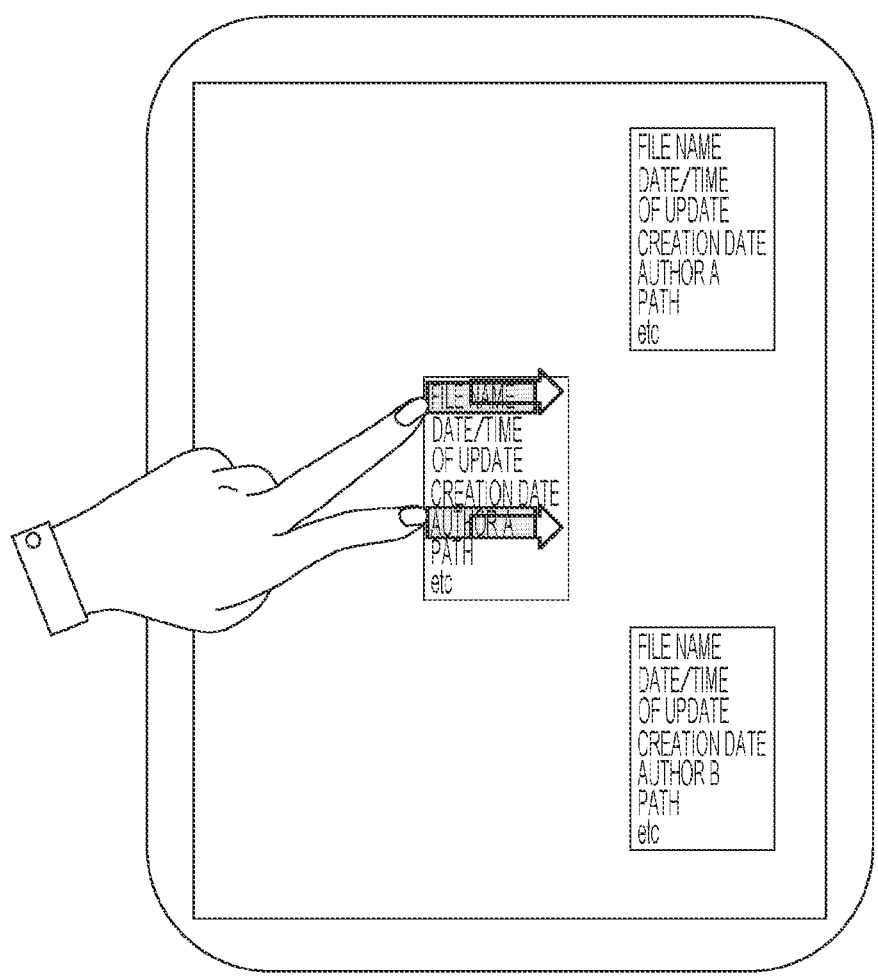
FIG. 29 is an eighteenth example of a screen according to the exemplary embodiment.

FIG. 29 illustrates a state where a user flicks two items in file information, for example, a file name and an author, with plural fingers, for example, a forefinger and a middle finger on the screen illustrated in FIG. 25. The CPU 10 determines that a multi-touch flick operation has been performed, obtains the values of the plural items that have been flicked, and searches for file information by using the values. Specifically, the CPU 10 searches for, under the AND condition, file information having the items whose values match the values of the obtained plural items. In FIG. 29, the CPU 10 searches for file information having the same file name and the same author, displays only file information obtained through the search, and hides the other file information. The user may easily find only file information having a necessary item only by performing a multi-touch flick operation.

Search under two conditions may be performed also if a multi-touch flick operation is performed using two fingers other than a forefinger and a middle finger. The same applies to a multi-touch operation with a finger of a right hand and a finger of a left hand. Further, if a multi-touch flick operation is performed using three fingers, the CPU 10 may perform search under three conditions. In general, a multi-touch with n fingers (n is a natural number) enables n search conditions to be set. The user may intuitively set a search condition by performing a multi-touch operation using fingers the number of which corresponds to the number of conditions to be used. The convenience obtained in the exemplary embodiment is clear compared to a case where a keyword is input as a search condition.

If a multi-touch flick operation is performed, documents may be narrowed down by the OR condition, not the AND condition. Also, the condition to be used for narrowing down may be set by a user. Alternatively, the AND condition may be used if a simultaneous flick operation is performed by multi-touch, and the OR condition may be used if a time-series flick operation is performed by multi-touch. Here, a time-series multi-touch means an operation in which a touch is performed using a certain finger, and immediately after that, a touch is performed using another finger. For example, a flick operation may be performed on "file name" using a forefinger, and immediately after that, a flick operation may be performed on "author" using a middle finger.

Figure 30:
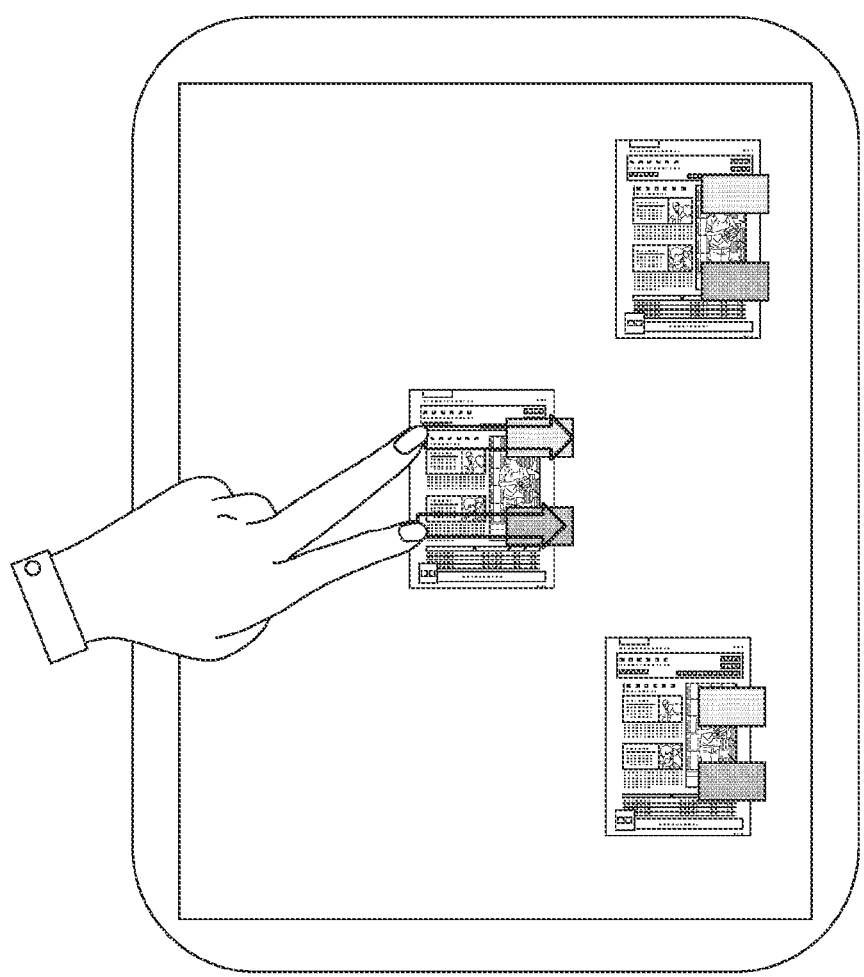
FIG. 30 is a nineteenth example of a screen according to the exemplary embodiment.

FIG. 30 illustrates a state where a flick operation has been performed by selecting annotations using a forefinger and a middle finger. Also in this case, the CPU 10 determines that a multi-touch flick operation has been performed within annotations, obtains the attributes of the flicked annotations, displays only thumbnails having annotations with the same attributes, and hides the other thumbnails.

Instead of a narrow-down process to obtain documents having the same annotation under the AND condition, a narrow-down process to obtain documents having annotations at the same position under the AND condition, or a narrow-down process to obtain documents having annotations including the same text under the AND condition may be performed. As in the case of file information, the OR condition may be used for narrowing-down instead of the AND condition, or the OR condition may be used for narrowing-down in the case of a time-series multi-touch.

Display of Selection Menu

If a multi-touch flick operation has been performed, a pop-up selection menu may be displayed so that the user is allowed to make a selection, instead of performing narrowing down under a preset condition.

Figure 31:
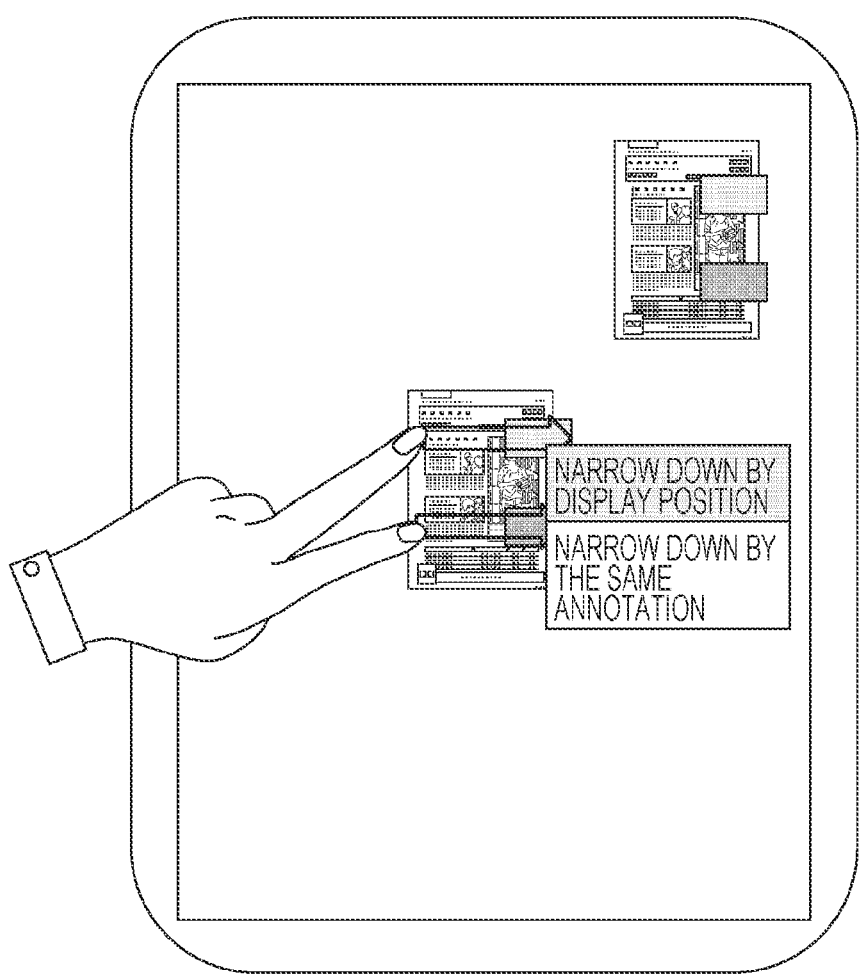
FIG. 31 is a twentieth example of a screen according to the exemplary embodiment.

FIG. 31 illustrates an example of a screen in a case where a flick operation has been performed on annotations using a forefinger and a middle finger. Upon a flick operation being performed, the CPU 10 determines that a multi-touch flick operation has been performed within annotations, creates a selection menu, and displays it on the touch panel 16 in a pop-up manner. In FIG. 31, "narrow down by display position" and "narrow down by the same annotation" are displayed as a selection menu. The former indicates that search is to be performed under the condition that the display position of the annotation is the same, and the latter indicates that search is to be performed under the condition that the attribute (shape or color) of the annotation is the same. The user may set a detailed condition of narrowing-down performed in response to a multi-touch flick operation, by tapping any one of items on the selection menu.

Figure 32:
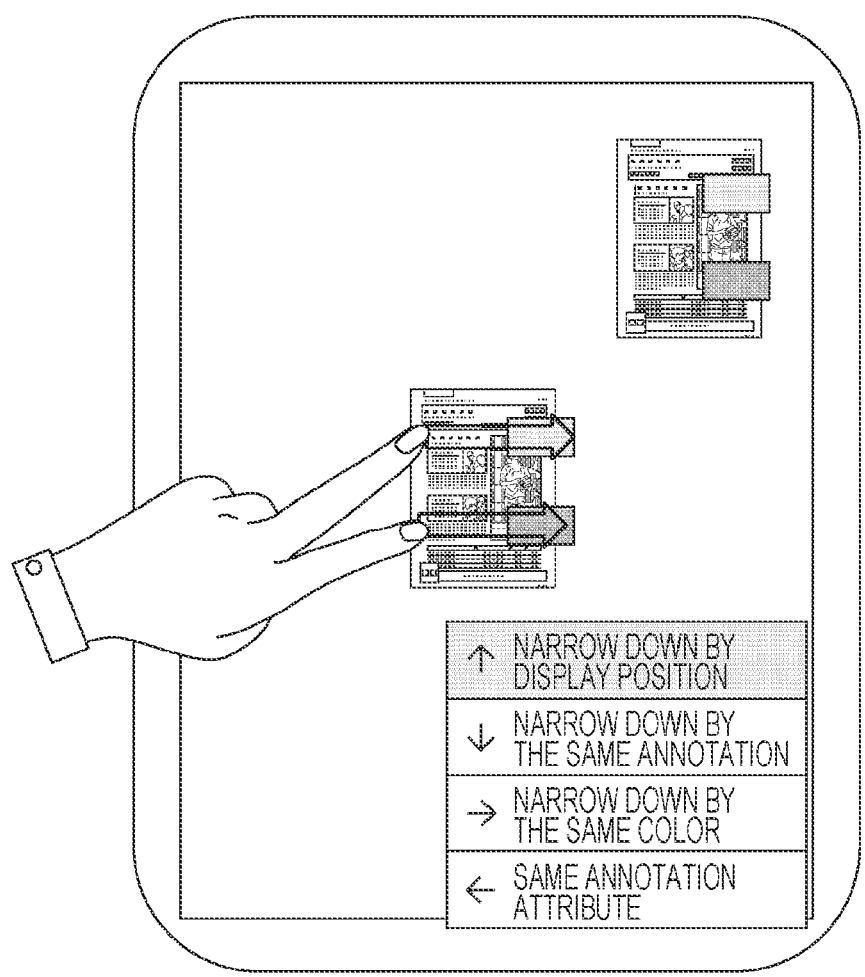
FIG. 32 is a twenty-first example of a screen according to the exemplary embodiment.

In FIG. 31, the pop-up selection menu is displayed near the annotations so that the selection menu is associated with the flicked annotations, but the display position is not specified. For example, as illustrated in FIG. 32, a pop-up selection menu may be displayed in a free space of the screen. Alternatively, in the case of displaying a selection menu, a direction of a flick operation for selecting a narrow-down condition may be displayed together with the narrow-down condition. In FIG. 32, an up-pointing arrow, a down-pointing arrow, a right-pointing arrow, and a left-pointing arrow are displayed on the left side of the selection items. These arrows indicate flick directions for selecting the respective narrow-down conditions. For example, if a user performs a multi-touch flick operation in the right direction and immediately after that performs a flick operation in the upward direction, the CPU 10 determines that a flick operation in the upward direction has been performed, and performs search by setting a condition of performing narrowing-down by the display position of the annotation. If the user performs a multi-touch flick operation in the right direction and immediately after that performs a flick operation in the downward direction, the CPU 10 determines that a flick operation in the downward direction has been performed, and performs search by setting a condition of performing narrowing-down by the same shape of the annotation. If the user performs a multi-touch flick operation in the right direction and immediately after that performs a flick operation in the right direction, the CPU 10 determines that a flick operation in the right direction has been performed, and performs search by setting a condition of performing narrowing-down by the same color. If the user performs a multi-touch flick operation in the right direction and immediately after that performs a flick operation in the left direction, the CPU 10 determines that a flick operation in the left direction has been performed, and performs search by setting a condition of performing narrowing-down by the same annotation attribute, that is, the same text data. In this example, the annotation attribute means text data in the annotation and is separated from the shape and color, but the annotation attribute may include the shape and color, as described above.

In this way, the CPU 10 displays a selection menu upon a multi-touch flick operation being performed. Accordingly, the user may perform narrowing down in various manners only by performing a flick operation.

In FIGS. 31 and 32, a selection menu for setting a narrow-down condition in response to a multi-touch flick operation is displayed. Alternatively, a narrow-down condition may be set also in response to a single-touch flick operation, not a multi-touch flick operation.

Figure 33:
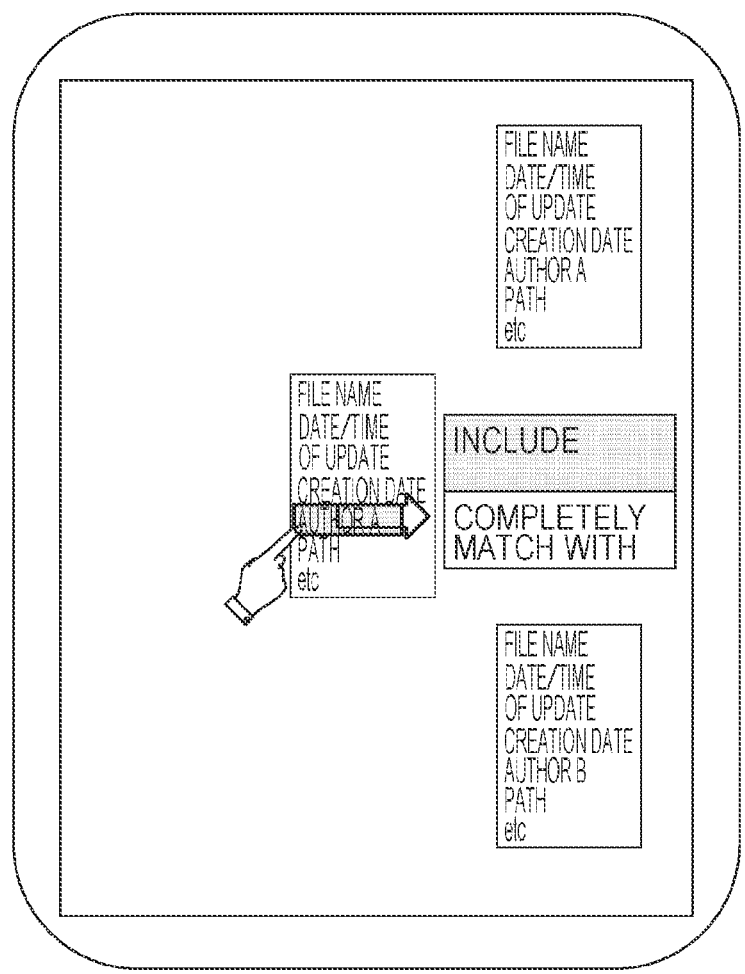
FIG. 33 is a twenty-second example of a screen according to the exemplary embodiment.

FIG. 33 illustrates an example of a screen in a case where one item has been selected from file information and a flick operation has been performed on a file information display screen. Upon the item "author A" being flicked, the CPU 10 displays a pop-up selection menu. The selection menu includes, for example, "include" and "completely match with". Upon the former being tapped, the CPU 10 searches for and displays one or more pieces of file information including "author A", and hides the other pieces of file information. Upon the latter being tapped, the CPU 10 searches for and displays one or more pieces of file information that completely match "author A", and hides the other pieces of file information. Of course, a narrow-down condition may be set in accordance with the direction of a flick operation.

As described above, in the exemplary embodiment, various processes may be performed through simple and intuitive flick operations. The processes performed by the CPU 10 in association with a flick operation in the right or left direction in the exemplary embodiment are as follows.

(1) A flick operation in the right or left direction on a screen showing a list of thumbnails of documents A flick operation over an area larger than a thumbnail area→switch to a screen showing a list of metadata A flick operation within a thumbnail→turn a page A flick operation on an annotation→search using an annotation (2) A flick operation in the right or left direction on a screen showing a list of metadata (file information, attribute information)

A flick operation over an area larger than a thumbnail area→switch to a screen showing a list of other metadata A flick operation within a thumbnail→search using an item Even in the same flick operation in the right or left direction, a process varies in accordance with a display mode of a screen, and a position of the flick operation. In particular, in a case where a list of metadata is displayed, if a flick operation is performed on one or plural specific items, search is automatically performed using the item or items, and the search result is displayed on the screen in an emphasized manner. An annotation may be grasped as metadata of a document. In this case, a flick operation performed on an annotation is substantially the same as a flick operation within a thumbnail on a screen showing a list of metadata.

The exemplary embodiment of the present invention has been described above. The embodiment of the present invention is not limited to the exemplary embodiment, and various modifications may be implemented.

For example, in FIG. 33, a pop-up selection menu is displayed upon a flick operation being performed on the item "author A". Alternatively, upon a flick operation being performed on the item "date", a selection menu may be displayed together with a direction of a flick operation, for example, "up-pointing arrow: before" and "down-pointing arrow: after". If a flick operation in the upward direction is performed immediately after a flick operation in the right direction is performed on the item "date", only the pieces of file information dated that date or before are displayed. If a flick operation in the downward direction is performed immediately after a flick operation in the right direction is performed on the item "date", only the pieces of file information dated that date or after are displayed. Accordingly, a narrow-down condition regarding a date may be easily set only by an intuitive flick operation.

In the exemplary embodiment, a screen is changed through a flick operation. Alternatively, the screen may be changed in accordance with the type of finger used to perform a flick operation. For example, with a flick operation using a forefinger, a screen showing a list of thumbnails of documents is scrolled, and, with a flick operation using a middle finger, a screen showing a list of thumbnails of documents is changed to a file information screen or an attribute information display screen.

In the exemplary embodiment, only the thumbnails, file information, and attribute information of documents obtained through narrowing-down are displayed, and the others are hidden. However, it is not always necessary to hide them, and the thumbnails, file information, and attribute information of documents obtained through narrowing-down may be displayed so as to stand out. For example, the thumbnails, file information, and attributed information of documents obtained through narrowing-down may be emphasized by displaying the other information translucently.

In the exemplary embodiment, a process may be changed by a combination of a flick operation and another operation. For example, a screen may be changed by a combination of a flick operation and an operation of pressing a certain position of the screen.

In the exemplary embodiment, a process is changed in accordance with the position and direction of a flick operation. In addition, a process may be changed in accordance with the speed of a flick operation. For example, if the speed of a flick operation in the downward direction is a threshold speed or less in the screen illustrated in FIG. 18, the CPU 10 displays a screen indicating the end of scroll. If the speed of a flick operation exceeds the threshold speed, the CPU 10 may change the screen to the screen illustrated in FIG. 19. Likewise, only if the speed of a flick operation in the downward direction exceeds the threshold speed in the screen illustrated in FIG. 19, the screen may be changed to the screen illustrated in FIG. 20. The elements specifying a flick operation include an operation position, an operation range, an operation direction, an operation speed, the number of fingers used for the operation, and the type of finger used for the operation. These elements may be appropriately used in combination. Examples of a combination of elements are as follows.

(a) Operation position and operation direction (b) Operation position, operation direction, and operation speed (c) Operation position, operation direction, and the number of fingers used for operation (d) Operation position, operation direction, and the type of finger used for operation (e) Operation position, operation direction, operation speed, and the number of fingers used for operation In the exemplary embodiment, search for a certain item is performed by flicking the certain item in file information or attribute information. Alternatively, search may be performed by performing a tap operation or double-tap operation instead of a flick operation. In this case, search is performed under the AND condition by performing a multi-tap operation.

In the exemplary embodiment, search for a certain item is performed by flicking the certain item in file information or attribute information in the right direction. Alternatively, a search condition may be canceled by performing a flick operation in the left direction. For example, if a user performs a flick operation in the right direction on "author A" on the screen illustrated in FIG. 25, the screen is changed to the screen illustrated in FIG. 26. If the user performs a flick operation in the left direction on the same "author A" on the screen illustrated in FIG. 26, search is canceled and the screen is changed to the screen illustrated in FIG. 25.

Further, in the exemplary embodiment, the CPU 10 executes change of a screen by a flick operation. The CPU 10 is not necessarily a single CPU, and a distributed process may be performed by plural CPUs, processors, or ASICs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image information processing apparatus comprising:
   a memory configured to store a plurality of pieces of image information and a plurality of pieces of related information related to the plurality of pieces of image information;
   a list screen display configured to display a screen showing a list of the plurality of pieces of image information;
   a detector configured to detect an indication operation having a direction, with a certain position on the screen being an origin; and
   a screen controller configured to perform, in accordance with a position and direction of the indication operation, control to switch between scrolling of the screen showing the list of the plurality of pieces of image information and displaying of a list of the plurality of pieces of related information,
   wherein the screen controller is further configured to perform the displaying of the list of the plurality of pieces of related information, while maintaining display positions on the screen showing the plurality of pieces of image information such that each of the plurality of pieces of related information is displayed in a display position of a corresponding one of the plurality of pieces of image information.

2. The image information processing apparatus according to claim 1, wherein
   in a case where the indication operation is an operation in an upward or downward direction, the screen controller is further configured to perform the scrolling of the screen, and
   in a case where the indication operation is an operation in a right or left direction over an area larger than a display area of one of the plurality of pieces of image information, the screen controller is further configured to perform the displaying of the list of the plurality of pieces of related information.

3. The image information processing apparatus according to claim 2, wherein
   the plurality of pieces of image information are a plurality of document files, each including a plurality of pages,
   the list screen display is further configured to display a list of pieces of specific page information of the plurality of document files, and
   in a case where the indication operation is an operation in a right or left direction within a display area of one of the plurality of pieces of image information, the screen controller is further configured to display a list of pieces of next page information of all the document files that are displayed.

4. The image information processing apparatus according to claim 2, wherein
   the plurality of pieces of image information are a plurality of pieces of image information, each having an annotation added thereto,
   the list screen display is further configured to display a list of the plurality of pieces of image information together with the added annotations, and
   in a case where the indication operation is an operation at a position of one of the annotations, the screen controller is further configured to search for a piece of image information having an annotation that matches the annotation indicated by the indication operation among the pieces of image information that are displayed, and display the piece of image information obtained through the search so as to stand out, while maintaining display positions on the screen showing the list of the plurality of pieces of image information.

5. The image information processing apparatus according to claim 4, wherein
   in a case where the indication operation is a multi-touch operation at positions of a plurality of annotations among the annotations, the screen controller is further configured to search for a piece of image information having annotations that match the plurality of annotations indicated by the indication operation among the pieces of image information that are displayed, and display the piece of image information obtained through the search so as to stand out, while maintaining display positions on the screen showing the list of the plurality of pieces of image information.

6. The image information processing apparatus according to claim 4, wherein
   the screen controller is further configured to display a selection menu that is to be used for selecting a condition of the search that is to be performed in response to the indication operation.

7. The image information processing apparatus according to claim 2, wherein
   in a case where the indication operation is an operation on an item in one of the plurality of pieces of related information displayed in a list, the screen controller is further configured to search for a piece of related information having an item whose value matches a value of the item indicated by the indication operation among the pieces of related information that are displayed, and display the piece of related information obtained through the search so as to stand out, while maintaining display positions on a screen showing the list of the plurality of pieces of related information.

8. The image information processing apparatus according to claim 7, wherein
in a case where the indication operation is a multi-touch operation on a plurality of items in one of the plurality of pieces of related information displayed in a list, the screen controller is further configured to search for a piece of related information having items whose values match values of the plurality of items indicated by the indication operation among the pieces of related information that are displayed, and display the piece of related information obtained through the search so as to stand out, while maintaining display positions on a screen showing the list of the plurality of pieces of related information.

9. The image information processing apparatus according to claim 1, wherein
in a case where the indication operation is an operation in an upward or downward direction, the screen controller is further configured to perform the scrolling of the screen, and
in a case where the indication operation is an operation in an upward or downward direction at an end of the screen that has been scrolled, the screen controller is further configured to perform the displaying of the list of the plurality of pieces of related information, while maintaining display positions on the screen showing the list of the plurality of pieces of image information.

10. The image information processing apparatus according to claim 9, wherein
the plurality of pieces of image information are a plurality of document files, each including a plurality of pages,
the list screen display is further configured to display a list of pieces of specific page information of the plurality of document files, and
in a case where the indication operation is an operation in a right or left direction within a display area of one of the plurality of pieces of image information, the screen controller is further configured to display a list of pieces of next page information of all the document files that are displayed.

11. The image information processing apparatus according to claim 9, wherein
the plurality of pieces of image information are a plurality of pieces of image information, each having an annotation added thereto,
the list screen display is further configured to display a list of the plurality of pieces of image information together with the added annotations, and
in a case where the indication operation is an operation at a position of one of the annotations, the screen controller is further configured to search for a piece of image information having an annotation that matches the annotation indicated by the indication operation among the pieces of image information that are displayed, and display the piece of image information obtained through the search so as to stand out, while maintaining display positions on the screen showing the list of the plurality of pieces of image information.

12. The image information processing apparatus according to claim 11, wherein
in a case where the indication operation is a multi-touch operation at positions of a plurality of annotations among the annotations, the screen controller is further configured to search for a piece of image information having annotations that match the plurality of annotations indicated by the indication operation among the pieces of image information that are displayed, and display the piece of image information obtained through the search so as to stand out, while maintaining display positions on the screen showing the list of the plurality of pieces of image information.

13. The image information processing apparatus according to claim 11, wherein
the screen controller is further configured to display a selection menu that is to be used for selecting a condition of the search that is to be performed in response to the indication operation.

14. The image information processing apparatus according to claim 9, wherein
in a case where the indication operation is an operation on an item in one of the plurality of pieces of related information displayed in a list, the screen controller is further configured to search for a piece of related information having an item whose value matches a value of the item indicated by the indication operation among the pieces of related information that are displayed,
and display the piece of related information obtained through the search so as to stand out, while maintaining display positions on a screen showing the list of the plurality of pieces of related information.

15. The image information processing apparatus according to claim 14, wherein
in a case where the indication operation is a multi-touch operation on a plurality of items in one of the plurality of pieces of related information displayed in a list, the screen controller is further configured to search for a piece of related information having items whose values match values of the plurality of items indicated by the indication operation among the pieces of related information that are displayed, and display the piece of related information obtained through the search so as to stand out, while maintaining display positions on a screen showing the list of the plurality of pieces of related information.

16. An image information processing method comprising:
storing a plurality of pieces of image information and a plurality of pieces of related information related to the plurality of pieces of image information;
displaying a screen showing a list of the plurality of pieces of image information;
detecting an indication operation having a direction, with a certain position on the screen being an origin; and
performing, in accordance with a position and direction of the indication operation, control to switch between scrolling of the screen showing the list of the plurality of pieces of image information and displaying of a list of the plurality of pieces of related information,
wherein performing the displaying of the list of the plurality of pieces of related information comprises displaying of the list of the plurality of pieces of related information, while maintaining display positions on the screen such that each of the plurality of pieces of related information is displayed in a display position of a corresponding one of the plurality of pieces of image information.

17. A non-transitory computer readable medium storing a program causing a computer to execute a process, the process comprising:
displaying, on a display, a screen showing a list of a plurality of pieces of image information;
detecting an indication operation having a direction, with a certain position on the screen being an origin; and performing, in accordance with a position and direction of the indication operation, control to switch between scrolling of the screen showing the list of the plurality of pieces of image information and displaying of a list of a plurality of pieces of related information, wherein performing the displaying of the list of the plurality of pieces of related information comprises displaying of the list of the plurality of pieces of related information, while maintaining display positions on the screen such that each of the plurality of pieces of related information is displayed in a display position of a corresponding one of the plurality of pieces of image information.

* * * * *